(12) United States Patent
Yasui et al.

(10) Patent No.: US 6,789,534 B2
(45) Date of Patent: Sep. 14, 2004

(54) AIR-FUEL RATIO CONTROL SYSTEM AND METHOD AND ENGINE CONTROL UNIT FOR INTERNAL COMBUSTION ENGINE

(75) Inventors: Yuji Yasui, Saitama-ken (JP); Takahide Mizuno, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/720,053

(22) Filed: Nov. 25, 2003

(65) Prior Publication Data

US 2004/0103890 A1 Jun. 3, 2004

(30) Foreign Application Priority Data

Nov. 28, 2002 (JP) ........................................ 2002/345274

(51) Int. Cl.[7] ............................................. F02D 41/14
(52) U.S. Cl. ...................... 123/673; 123/494; 701/103; 701/115
(58) Field of Search ................................ 123/673, 674, 123/472, 494; 701/103, 104, 115

(56) References Cited

U.S. PATENT DOCUMENTS 4,934,328 A * 6/1990 Ishii et al. .................. 123/673
5,908,463 A * 6/1999 Akazaki et al. ............. 701/104
6,499,474 B2 * 12/2002 Wachi et al. ................ 123/673
2004/0003804 A1 * 1/2004 Yasui .......................... 123/673

FOREIGN PATENT DOCUMENTS

JP 9023 * 1/1998 ........... F02D/41/14

* cited by examiner

Primary Examiner—Hai Huynh
(74) Attorney, Agent, or Firm—Squire, Sanders & Dempsey L.L.P.

(57) ABSTRACT

An air-fuel ratio control system for an internal combustion engine is provided which is capable of appropriately and promptly correcting variation in the air-fuel ratio of a mixture between cylinders and realizing a very robust air-fuel ratio control, even with a complicated exhaust system layout. The ECU of the system for control of the air-fuel ratio of a mixture supplied to first to fourth cylinders determines a feedback correction coefficient, calculates a cylinder-by-cylinder variation coefficient indicative of variation in air-fuel ratio between the cylinders, based on a model parameter of a model having the input of the feedback correction coefficient thereto and the output of the detected air-fuel ratio, identifies the model parameter, corrects a basic fuel injection amount such that the cylinder-by-cylinder variation parameter converges to a moving average value thereof, thereby calculating a cylinder-by-cylinder final fuel injection amount.

30 Claims, 16 Drawing Sheets

FIG. 3

$$KACT_i(k) = b0_i(k) \cdot KSTR_i(k-3) + r1_i(k) \cdot KSTR_i(k-4) + r2_i(k) \cdot KSTR_i(k-5)$$
$$+ r3_i(k) \cdot KSTR_i(k-6) + s0_i(k) \cdot KACT_i(k-3) \quad \cdots \cdots (1)$$

$$KSTR_i(k) = \frac{1}{b0_i(k)} \cdot \{KCMD_i(k) - r1_i(k) \cdot KSTR_i(k-1) - r2_i(k) \cdot KSTR_i(k-2)$$
$$- r3_i(k) \cdot KSTR_i(k-3) - s0_i(k) \cdot KACT_i(k)\} \quad \cdots \cdots (2)$$

$$\theta_i(k) = \theta_i(k-1) + KP_i(k) \cdot ide_i(k) \quad \cdots \cdots (3)$$

$$\theta_i(k)^T = [b0_i(k), r1_i(k), r2_i(k), r3_i(k), s0_i(k)] \quad \cdots \cdots (4)$$

$$ide_i(k) = KACT_i(k) - KACT\_HAT_i(k) \quad \cdots \cdots (5)$$

$$KACT\_HAT_i(k) = \theta_i(k-1)^T \cdot \zeta_i(k) \quad \cdots \cdots (6)$$

$$\zeta_i(k)^T = [KSTR_i(k-3), KSTR_i(k-4), KSTR_i(k-5), KSTR_i(k-6), KACT_i(k-3)]$$
$$\cdots \cdots (7)$$

$$KP_i(k) = \frac{P_i(k) \cdot \zeta_i(k)}{1 + \zeta_i(k)^T \cdot P_i(k) \cdot \zeta_i(k)} \quad \cdots \cdots (8)$$

$$P_i(k+1) = \frac{1}{\lambda_1}\left(I - \frac{\lambda_2 \cdot P_i(k) \cdot \zeta_i(k) \cdot \zeta_i(k)^T}{\lambda_1 + \lambda_2 \cdot \zeta_i(k)^T \cdot P_i(k) \cdot \zeta_i(k)}\right) P_i(k) \quad \cdots \cdots (9)$$

$I$ : UNIT PARAMETER
$\lambda_1, \lambda_2$ : WEIGHTING PARAMETER

FIG. 4

$$\theta\_ave(n) = \frac{1}{m+1}\{\theta buf(n) + \cdots + \theta buf(n-m)\} \quad \cdots\cdots (10)$$

$$\theta\_ave(n)^T = [b0\_ave(n), r1\_ave(n), r2\_ave(n), r3\_ave(n), s0\_ave(n)] \quad \cdots\cdots (11)$$

$$KSTR(n) = \frac{1}{b0\_ave(n)}\{KCMD(n) - r1\_ave(n)KSTR(n-4) - r2\_ave(n)KSTR(n-8)$$
$$- r3\_ave(n)KSTR(n-12) - s0\_ave(n)KACT(n)\} \quad \cdots\cdots (12)$$

$$\theta_i(k) = \theta_i(k-1) + KP_i(k) \cdot ide_i(k) \quad \cdots\cdots (13)$$

$$\theta_i(k)^T = [b0_i(k), r1_i(k), r2_i(k), r3_i(k), s0_i(k)] \quad \cdots\cdots (14)$$

$$ide_i(k) = KACT_i(k) - KACT\_HAT_i(k) \quad \cdots\cdots (15)$$

$$KACT\_HAT_i(k) = \theta_i(k-1)^T \cdot \zeta_i(k) \quad \cdots\cdots (16)$$

$$\zeta_i(k)^T = [KSTR_i(k-3), KSTR_i(k-4), KSTR_i(k-5), KSTR_i(k-6), KACT_i(k-3)]$$
$$= [KSTR_i(n-12), KSTR_i(n-16), KSTR_i(n-20), KSTR_i(n-24), KACT_i(n-12)] \quad \cdots\cdots (17)$$

$$KP_i(k) = \frac{P_i(k) \cdot \zeta_i(k)}{1 + \zeta_i(k)^T \cdot P_i(k) \cdot \zeta_i(k)} \quad \cdots\cdots (18)$$

$$P_i(k+1) = \frac{1}{\lambda_1}\left(I - \frac{\lambda_2 \cdot P_i(k) \cdot \zeta_i(k) \cdot \zeta_i(k)^T}{\lambda_1 + \lambda_2 \cdot \zeta_i(k)^T \cdot P_i(k) \cdot \zeta_i(k)}\right) P_i(k) \quad \cdots\cdots (19)$$

I : UNIT PARAMETER
$\lambda_1, \lambda_2$ : WEIGHTING PARAMETER

F I G. 5

$$\theta_i(k) = \sigma f \cdot \theta_i(k-1) + KP_i(k) \cdot ide_i(k) \quad \cdots \cdot (20)$$

$$\theta_i(k)^T = [b0_i(k), r1_i(k), r2_i(k), r3_i(k), s0_i(k)] \quad \cdots \cdot (21)$$

$$ide_i(k) = KACT_i(k) - KACT\_HAT_i(k) \quad \cdots \cdot (22)$$

$$KACT\_HAT_i(k) = \theta_i(k-1)^T \cdot \zeta_i(k) \quad \cdots \cdot (23)$$

$$\begin{aligned}\zeta_i(k)^T &= [KSTR_i(k-3), KSTR_i(k-4), KSTR_i(k-5), KSTR_i(k-6), KACT_i(k-3)] \\ &= [KSTR_i(n-12), KSTR_i(n-16), KSTR_i(n-20), KSTR_i(n-24), KACT_i(n-12)]\end{aligned}$$
$$\cdots \cdot (24)$$

$$KP_i(k) = \frac{Pf \cdot \zeta_i(k)}{1 + \zeta_i(k)^T \cdot Pf \cdot \zeta_i(k)} \quad \cdots \cdot (25)$$

$Pf$: IDENTIFICATION GAIN (VECTOR HAVING 1 ROW AND 5 COLUMNS)

$$\sigma f = \begin{bmatrix} 1 & 0 & 0 & 0 & 0 \\ 0 & a & 0 & 0 & 0 \\ 0 & 0 & a & 0 & 0 \\ 0 & 0 & 0 & a & 0 \\ 0 & 0 & 0 & 0 & a \end{bmatrix} \quad (0 < a < 1) \quad \cdots \cdot (26)$$

$\sigma f$: FORGETTING VECTOR

FIG. 6

$$KACT' = b0_i(k) \cdot KSTR' + r1_i(k) \cdot KSTR' + r2_i(k) \cdot KSTR'$$
$$+ r3_i(k) \cdot KSTR' + s0_i(k) \cdot KACT' \quad \cdots \cdot (27)$$

$$[1 - s0_i(k)]KACT' = [b0_i(k) + r1_i(k) + r2_i(k) + r3_i(k)]KSTR' \quad \cdots \cdot (28)$$

$$KACT' = \frac{b0_i(k) + r1_i(k) + r2_i(k) + r3_i(k)}{1 - s0_i(k)} \cdot KSTR' \quad \cdots \cdot (29)$$

$$AFOFT_i(k) = \frac{b0_i(k) + r1_i(k) + r2_i(k) + r3_i(k)}{1 - s0_i(k)} \quad \cdots \cdot (30)$$

$$AFOFTAVE(n) = \frac{1}{mc} \cdot \sum_{i=1}^{mc} AFOFT_i(n) \quad \cdots \cdot (31)$$

mc : NUMBER OF CYLINDERS $$KAFOFT_i(n) = -GI \cdot \sum_{j=0}^{n} e(j) - FI \cdot AFOFT_i(n) - HI \cdot [AFOFT_i(n) - AFOFT_i(n-1)]$$
$$\cdots \cdot (32)$$

FI, GI, HI : FEEDBACK GAINS $$e(n) = AFOFT_i(n) - AFOFTAVE(n) \quad \cdots \cdot (33)$$

F I G. 7A
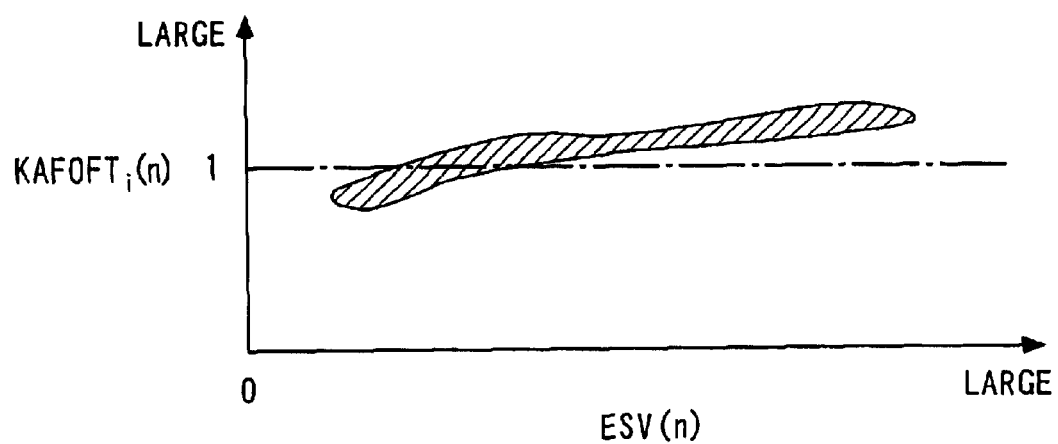
F I G. 7B
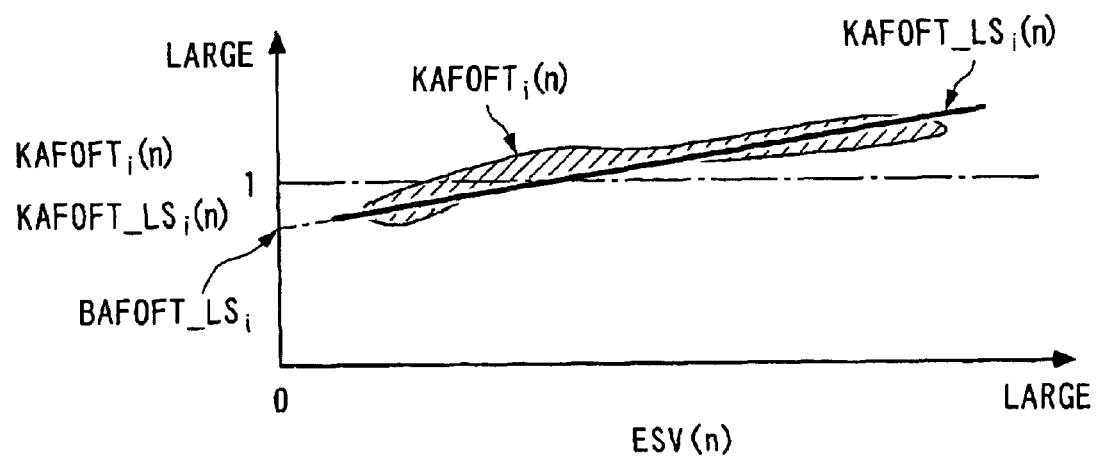

FIG. 8

$$ESV(n) = \frac{NE(n)}{1500} \cdot PBA(n) \cdot SVPRA \qquad \cdots\cdots (34)$$

$$KAFOFT\_LS_i(n) = AAFOFT\_LS_i \cdot ESV(n) + BAFOFT\_LS_i \qquad \cdots\cdots (35)$$

$$\theta AFOFT\_LS_i(n) = \theta AFOFT\_LS_i(n-1) + KQ_i(n) \cdot Eaf_i(n) \qquad \cdots\cdots (36)$$

$$\theta AFOFT\_LS_i(n)^T = [AAFOFT\_LS_i(n), BAFOFT\_LS_i(n)] \qquad \cdots\cdots (37)$$

$$Eaf_i(n) = KAFOFT_i(n) \cdot KAFOFT\_LS_i(n) - \theta AFOFT\_LS_i(n-1)^T \cdot Z(n)$$
$$\cdots\cdots (38)$$

$$KAFOFT\_LS_i(n) = \theta AFOFT\_LS_i(n-1)^T \cdot Z(n) \qquad \cdots\cdots (39)$$

$$Z(n)^T = [ESV(n), 1] \qquad \cdots\cdots (40)$$

$$KQ_i(n) = \frac{Q_i(n) \cdot Z(n)}{1 + Z_i(n) \cdot Q_i(n) \cdot Z(n)} \qquad \cdots\cdots (41)$$

$$Q_i(n+1) = \frac{1}{\lambda_1'} \cdot \left( I - \frac{\lambda_2' \cdot Q_i(n) \cdot Z(n)^T \cdot Z(n)}{\lambda_1' + \lambda_2' \cdot Z(n)^T \cdot Q_i(n) \cdot Z(n)} \right) \cdot Q_i(n) \qquad \cdots\cdots (42)$$

$I$ : UNIT PARAMETER
$\lambda_1', \lambda_2'$ : WEIGHTING PARAMETER $$KAFOFT\_LS_i(n) = \theta AFOFT\_LS_i(n-1)^T \cdot Z(n)$$
$$= AAFOFT\_LS_i(n-1) \cdot ESV(n) + BAFOFT\_LS_i(n-1)$$
$$\cdots\cdots (43)$$

FIG. 16

IP-D CONTROL ALGORITHM $$KAFOFT_i(n) = -GD \cdot \sum_{j=0}^{n} e(j) - FD \cdot e(n) - HD \cdot [AFOFT_i(n) - AFOFT_i(n-1)] \quad \cdots\cdots (45)$$

$$e(n) = AFOFT_i(n) - AFOFTAVE(n) \quad \cdots\cdots (46)$$

FD, GD, HD : FEEDBACK GAINS

RESPONSE-SPECIFIED CONTROL ALGORITHM $$KAFOFT_i(n) = -FS \cdot \sigma(n) - GS \cdot \sum_{j=0}^{n} \sigma(j) - HS \cdot e(n) \quad \cdots\cdots (47)$$

$$e(n) = AFOFT_i(n) - AFOFTAVE(n) \quad \cdots\cdots (48)$$

$$\sigma(n) = e(n) + S \cdot e(n-1) \quad \cdots\cdots (49)$$

$\sigma(n)$ : SWITCHING FUNCTION
FS, GS, HS : FEEDBACK GAINS
S : SWITCHING FUNCTION-SETTING PARAMETER

AIR-FUEL RATIO CONTROL SYSTEM AND METHOD AND ENGINE CONTROL UNIT FOR INTERNAL COMBUSTION ENGINE

BACKGROUND OF THE INVENTION

1. Field of the Invention

The present invention relates to an air-fuel ratio control system and method and an engine control unit for an internal combustion engine, for controlling the air-fuel ratio of a mixture supplied to a plurality of cylinders of the engine on a cylinder-by-cylinder basis.

2. Description of the Related Art

Recently, it is demanded of internal combustion engines due to social requirements that the engines have excellent exhaust emission characteristics, that is, an excellent emission reduction rate of the catalyst. On the other hand, internal combustion engines having a plurality of cylinders can suffer variation in air-fuel ratio between the cylinders to which a mixture is supplied, due to the malfunction of an EGR system, an evaporative fuel processing system, or injectors. In such a case, there is a fear of the emission reduction rate of the catalyst being lowered. Therefore, to overcome the problem, as an air-fuel ratio control system for an internal combustion engine, which corrects (absorbs) variation in air-fuel ratio between cylinders, there has been conventionally proposed one to which is applied an observer based on the optimal control theory (see e.g. Publication of Japanese Pat. No. 3296472, pages 18–23, FIGS. 35 and 36). This air-fuel ratio control system is comprised of a LAF sensor disposed in the collecting section of an exhaust pipe, for detecting the air-fuel ratio of exhaust gases, a control unit to which a detection signal (indicative of the detected air-fuel ratio) from the LAF sensor is input, and injectors disposed in the intake manifold of the exhaust pipe for the respective cylinders and connected to the control unit.

In this control unit, the variation in the air-fuel ratio of the mixture supplied to each cylinder is corrected by calculating a cylinder-by-cylinder fuel injection amount #nTout (n=1 to 4) as the amount of fuel to be injected into each cylinder, based on the detected air-fuel ratio output from the LAF sensor, using the observer and by PID control, as described below.

That is, the control unit calculates the basic fuel injection amount Tim depending on the operating conditions of the engine, and multiplies the basic fuel injection amount by various correction coefficients to calculate the output fuel injection amount Tout. Then, as described below, the observer calculates a cylinder-by-cylinder estimated air-fuel ratio #nA/F, and a cylinder-by-cylinder estimated feedback correction coefficient #nKLAF is determined by PID control based on the estimated cylinder-by-cylinder air-fuel ratio #nA/F. The cylinder-by-cylinder fuel injection amount #nTout is calculated by multiplying the output fuel injection amount Tout by the cylinder-by-cylinder feedback correction coefficient #nKLAF.

The cylinder-by-cylinder estimated air-fuel ratio #nA/F is calculated by the observer based on the optimal control theory. More specifically, by using a model of a discrete-time system representative of the relationship between a cylinder-by-cylinder fuel-air ratio and a fuel-air ratio detected at the collecting section (where the LAF sensor is disposed), the cylinder-by-cylinder air-fuel ratio #nA/F is calculated. Further, in the PID control, a value obtained by dividing the fuel-air ratio detected at the collecting section, i.e. the detected air-fuel ratio KACT, by the average value of the respective preceding values of the feedback correction coefficients #nKLAF is set to a target value, and the cylinder-by-cylinder feedback correction coefficient #nKLAF is calculated such that the difference between the target value and the cylinder-by-cylinder estimated air-fuel ratio #nA/F calculated by the observer converges to a value of 0.

Recently, aside from the above-mentioned demand of excellent exhaust emission characteristics, internal combustion engines are demanded of higher power output and higher torque. To meet the demand, there is employed the technique of reducing the exhaust resistance by configuring the layout of the exhaust system into a complicated shape (in which exhaust passages from the cylinders are progressively combined in the exhaust manifold such that four passages, for example, are combined into two passages, and the two passages are then combined into one passage). However, when the conventional air-fuel ratio control system is applied to internal combustion engines having such an exhaust system layout, the observer can be no longer applicable based on the conventional optimal control theory, and therefore, the variation in air-fuel ratio between the cylinders cannot be properly corrected, which can lead to a lowered emission reduction rate of the catalyst. This is because according to the conventional optimal control theory, modeling errors and changes in the dynamic characteristics of a model are not considered in the simulation model and the optimal control theory itself, which makes the observer small in margin of stability and low in robustness. Therefore, the air-fuel ratio control system does not have a sufficient stability against changes in the contributions of exhaust gases from the individual cylinders to the detected air-fuel ratio of the LAF sensor caused by attachment of fuel, etc., changes in the response of the LAF sensor, and the aging of the same.

SUMMARY OF THE INVENTION

It is an object of the present invention to provide an air-fuel ratio control system and method and an engine control unit for an internal combustion engine, which are capable of appropriately and promptly correcting variation in air-fuel ratio between a plurality of cylinders and realizing a very robust air-fuel ratio control.

To attain the above object, in a first aspect of the present invention, there is provided an air-fuel ratio control system for an internal combustion engine including a plurality of cylinders and an exhaust passage through which exhaust gases from the cylinders flow, the air fuel ratio control system controlling an amount of fuel to be supplied to each of the cylinders, on a cylinder-by-cylinder basis, to thereby control an air fuel ratio of a mixture supplied to each cylinder.

The air-fuel ratio control system according to the first aspect of the present invention is characterized by comprising:

fuel amount-determining means for determining an amount of fuel to be supplied to each cylinder;

correction parameter-determining means for determining a correction parameter for correcting the amount of fuel to be supplied to each cylinder;

first fuel amount-correcting means for correcting the determined amount of fuel to be supplied to each cylinder, according to the determined correction parameter;

air-fuel ratio parameter-detecting means for detecting an air-fuel ratio parameter indicative of an air-fuel ratio of the exhaust gases flowing through the exhaust passage;

variation parameter-calculating means for calculating a variation parameter indicative of a variation in air-fuel ratio between the plurality of parameters, on a cylinder-by-cylinder basis, based on a model parameter of a model formed by modeling each cylinder and having an input of the correction parameter and an output of the air-fuel ratio parameter;

identification means for identifying the model parameter of the model based on the determined correction parameter and the detected air-fuel ratio parameter; and second fuel amount-correcting means for further correcting the amount of fuel to be supplied to the plurality of cylinders on a cylinder-by-cylinder basis such that the variation parameter calculated on a cylinder-by-cylinder basis converges to a predetermined target value.

With the arrangement of the air-fuel ratio control system according to the first aspect of the present invention, an amount of fuel to be supplied to each cylinder is determined by the fuel amount-determining means, and corrected according to a correction parameter by the first fuel amount-correcting means. Further, a variation parameter indicative of a variation in air-fuel ratio between the plurality of parameters is calculated by the variation parameter-calculating means, on a cylinder-by-cylinder basis, based on a model parameter of a model formed by modeling each cylinder and having an input of the correction parameter and an output of the air-fuel ratio parameter, and the amount of fuel to be supplied to each cylinder is further corrected by the second fuel amount-correcting means such that the variation parameter calculated on a cylinder-by-cylinder basis converges to a predetermined target value. That is, the amount of fuel to be supplied to the engine is corrected such that variation in air-fuel ratio between the cylinders is corrected. Further, the model parameter of the model is identified based on the determined correction parameter and the detected air-fuel ratio parameter by the identification means. As described above, the variation parameter for correcting the amount of fuel to be supplied to each cylinder is calculated based on the model parameter identified based on the correction parameter and the air-fuel ratio parameter, and hence, by using e.g. an onboard identifier for the identification means, it is possible to calculate the variation parameter based on the model parameter identified in real time. Therefore, differently from the prior art, even when the dynamic characteristics of a controlled object are changed due to changes in respective contributions of the individual cylinders (exhaust gasses therefrom) to the detected air-fuel ratio, which are caused by attachment of fuel in the cylinders, changes in the response of the air-fuel ratio parameter-detecting means, and aging of the air-fuel ratio parameter-detecting means, it is possible to correct the variation in air-fuel ratio between the cylinders while causing the changes in the dynamic characteristics of the controlled object to be reflected in the model. As a result, even when the air-fuel ratio control system is applied to an internal combustion engine having a complicated exhaust system layout, it is possible to realize a highly robust air-fuel ratio control, and thereby maintain an excellent emission reduction rate of the catalyst.

Preferably, the air-fuel ratio control system further comprises target value-setting means for setting an average value of the variation parameter to the predetermined target value.

With the arrangement of this preferred embodiment, an average value of the variation parameter is set to the predetermined target value by the target value-setting means, and therefore, the amount of fuel to be supplied to each cylinder is corrected by the second fuel amount-correcting means such that the variation parameter converges to the average value without being diverged. Thus, the amount of fuel to be supplied to each cylinder is corrected such that the variation parameter converges to the average value thereof, which makes it possible to correct the variation in air-fuel ratio between the cylinders. As a result, it is possible to correct the variation in air-fuel ratio between the cylinders while avoiding interfering with correction of the amount of fuel by the first fuel amount-correcting means, i.e. the air-fuel ratio control. For the same reason, even when another type of feedback control or feedforward control is executed in parallel in the air-fuel ratio control, it is possible to correct variation in air-fuel ratio between a plurality of cylinders while avoiding interference with such control.

Preferably, the correction parameter-determining means determines the correction parameter such that the air-fuel ratio parameter is caused to converge to a predetermined target air-fuel ratio value.

With the arrangement of this preferred embodiment, the correction parameter is determined by the correction parameter-determining means such that the air-fuel ratio parameter is caused to converge to a predetermined target air-fuel ratio value, and the amount of fuel to be supplied to each cylinder is corrected by the first fuel amount-correcting means according to the correction parameter. In other words, the correction parameter and the variation parameter are calculated separately, and at the same time, corrections of the amount of fuel responsive to the two parameters are separately executed by the different types of fuel amount-correcting means, respectively. This makes it possible to carry out two types of air-fuel ratio control, i.e. air-fuel ratio control for correcting variation in air-fuel ratio between the cylinders, and air-fuel ratio control for causing the air-fuel ratio of exhaust gases to converge to a predetermined target value, without causing interference therebetween. This makes it possible to control the air-fuel ratio of exhaust gases to the predetermined target value while correcting variation in air-fuel ration between the cylinders, and thereby enhance the emission reduction rate of the catalyst.

Preferably, the model parameter is of a model formed by modeling one of the plurality of cylinders, the correction parameter-determining means determining the correction parameter based on the model parameter, and the first fuel amount-correcting means corrects the mount of fuel to be supplied to all of the plurality of cylinders according to the determined correction parameter.

With the arrangement of this preferred embodiment, the correction parameter is determined by the correction parameter-determining means based on the model parameter of a model formed by modeling one of the plurality of cylinders, and the first fuel amount-correcting means corrects the amount of fuel to be supplied to all of the cylinders according to the determined correction parameter. This makes it possible to correct the amount of fuel to be supplied to all the cylinders without interfering with correction of the amount of fuel to be made for correction of variation in air-fuel ratio between the cylinders. Further, as described above, this model parameter is identified by the identification means, and therefore, by using e.g. an onboard identifier as the identification means, the correction parameter can be calculated based on the model parameter identified in real time. Therefore, even when the dynamic characteristics of a controlled object are changed due to changes in respective contributions of the individual cylinders (exhaust gases therefrom) to the detected air-fuel ratio, which are caused by attachment of fuel in the cylinders, changes in the response of the air-fuel ratio parameter-detecting means, and aging of the air-fuel ratio parameter-detecting means, it is possible to correct the amount of fuel to be supplied to all the cylinders while causing the changes in the dynamic characteristics of the controlled object to be reflected in the model, whereby the robustness of air-fuel ratio control can be further enhanced.

Preferably, the second fuel amount-correcting means executes correction of the amount of fuel, based on one of an I-PD control algorithm and an IP-D control algorithm.

With the arrangement of this preferred embodiment, the amount of fuel is corrected based on an I-PD control algorithm or an IP-D control algorithm by the second fuel amount-correcting means. This makes it possible to calculate the correction amount such that the correction of the amount of fuel does not overshoot the target value. This makes it possible to correct variation in air-fuel ratio between the cylinders while preventing the behavior of the air-fuel ratio of each cylinder from becoming oscillatory, thereby enhancing stability of the air-fuel ratio control.

Preferably, the second fuel amount-correcting means executes correction of the amount of fuel, based on a response-specified control algorithm.

With the arrangement of this preferred embodiment, the amount of fuel is corrected by the second fuel amount-correcting means based on the response-specified control algorithm. This makes it possible to calculate the correction amount such that the correction of the amount of fuel does not overshoot the target value and that the variation in air-fuel ratio between the cylinders converges in a specified converging behavior. This makes it possible to correct the variation in air-fuel ratio between the cylinders while preventing the behavior of the air-fuel ratio of each cylinder from becoming oscillatory, thereby enhancing the stability of the air-fuel ratio control.

To attain the above object, in a second aspect of the present invention, there is provided an air-fuel ratio control system for an internal combustion engine including a plurality of cylinders, the air fuel ratio control system controlling an amount of fuel to be supplied to each of the cylinders, on a cylinder-by-cylinder basis, to thereby control an air fuel ratio of a mixture supplied to each cylinder.

The air-fuel ratio control system according to the second aspect of the present invention is characterized by comprising:

first operating condition parameter-detecting means for detecting a first operating condition parameter indicative of an operating condition of the engine;

fuel amount-determining means for determining an amount of fuel to be supplied to each cylinder;

variation correction coefficient-calculating means for calculating a variation correction coefficient for correcting variation in air-fuel ratio between the plurality of cylinders, on a cylinder-by-cylinder basis;

learned value-calculating means for calculating a learned value of the variation correction coefficient, on a cylinder-by-cylinder basis, according to the calculated variation correction coefficient and the detected first operating condition parameter; and fuel amount-correcting means for correcting the determined amount of fuel to be supplied to each cylinder, according to the calculated learned value of the variation correction coefficient and the calculated variation correction coefficient.

With the arrangement of the air-fuel ratio control system according to the second aspect of the present invention, a first operating condition parameter indicative of an operating condition of the engine is detected by the first operating condition parameter-detecting means, and an amount of fuel to be supplied to each cylinder is determined by the fuel amount-determining means. A variation correction coefficient for correcting variation in air-fuel ratio between the plurality of cylinders is calculated on a cylinder-by-cylinder basis by the variation correction coefficient-calculating means. Further, a learned value of the variation correction coefficient is calculated according to the calculated variation correction coefficient and the detected first operating condition parameter by the learned value-calculating means, and the amount of fuel to be supplied to each cylinder is corrected according to the calculated learned value of the variation correction coefficient and the calculated variation correction coefficient by the fuel amount-correcting means. As described above, the amount of fuel to be supplied to each cylinder is corrected according to the learned value of the variation correction coefficient calculated according to the first operating condition parameter. Therefore, even when the state of variation in air-fuel ratio between the cylinders is changed due to a change in the operating condition of the engine, it is possible to correct the amount of fuel to be supplied to each cylinder, in response thereto. This makes it possible to control the air-fuel ratio, even when the engine is in a transient operating condition, while compensating for a change in the state of variation in air-fuel ratio between the cylinders, whereby it is possible to maintain an excellent exhaust emission reduction rate.

Preferably, the learned value-calculating means calculates the learned value of the variation correction coefficient, by a regression equation using the leaned value as a dependent variable and at the same time using the first operating condition parameter as an independent variable, and calculates a regression coefficient and a constant term of the regression equation by a sequential least-squares method.

With the arrangement of this preferred embodiment, the learned value-calculating means calculates the learned value of the variation correction coefficient, by a regression equation using the leaned value as a dependent variable and at the same time using the first operating condition parameter as an independent variable, and calculates a regression coefficient and a constant term of the regression equation by a sequential least-squares method. Thus, the regression coefficient and the constant term of the regression equation used for calculation of the learned value are calculated by the sequential least-squares method. This makes it possible to calculate the learned value of the variation correction coefficient such that the error between the learned value and the variation correction coefficient is reduced, whereby the accuracy of calculation of the learned value can be enhanced, and even when the operating condition of the engine changes, i.e. the dynamic characteristics of the controlled object change, it is possible to more appropriately correct the variation in air-fuel ratio between the cylinders while causing the change to be reflected in the calculation. Further, due to necessity of calculation of learned values for the plurality of cylinders, respectively, when the least-squares method, for example, is employed as the method of calculating the learned value, it is necessary to carry out inverse matrix calculation and store a large number of data. In the case of this preferred embodiment, however, since the sequential least-squares method is employed, it is possible to calculate the learned values using data sequentially calculated, without executing the inverse matrix calculation and storage of a large number of data. This can reduce the computing time of the learned value. As a result, it is possible to obtain the advantageous effects described above, using a computer having a relatively low computing power, such as a vehicle-mounted computer.

Preferably, the air-fuel ratio control system further comprises second operating condition parameter-detecting means for detecting a second operating condition parameter indicative of an operating condition of the engine, and when the detected second operating condition parameter is not within a predetermined range, the learned value-calculating means calculates the learned value of the variation correction coefficient, on a cylinder-by-cylinder basis, according to a value of the variation correction coefficient calculated when the detected second operating condition parameter was within the predetermined range.

In general, when the engine is in an unstable operating condition, such as a very high load operating condition, the calculation of a parameter indicative of variation in air-fuel ratio, such as the variation correction coefficient used in the present invention, is affected by the unstable operating condition which can vary the result of the calculation. Also when the engine is a very low-load operating condition, the accuracy of the calculation can be lowered e.g. due to lowered detection accuracy of a sensor that detects the air-fuel ratio. Further, when the engine is in a high engine speed operation, the frequency of the air-fuel ratio caused by variation in air-fuel ratio becomes high, which can lower the accuracy of calculation of a parameter indicative of the state of the variation. Thus, there is a fear of being incapable of obtaining an appropriately calculated value of the variation correction coefficient. In the air-fuel ratio control system according to the preferred embodiment, however, when the detected second operating condition parameter is not within a predetermined range, the learned value of the variation correction coefficient is calculated using a value of the variation correction coefficient calculated when the detected second operating condition parameter was within the predetermined range. Therefore, even when the engine is in an unstable operating condition, by properly setting the predetermined range, the learned value can be calculated properly according to the variation correction coefficient calculated when the engine was in a stable operating condition. As a result, it is possible to properly correct the variation in air-fuel ratio between the cylinders while avoiding adverse influence of the unstable operating condition of the engine on the calculation, enhance the stability of the air-fuel ratio control, and maintain an excellent emission reduction rate of the catalyst.

Preferably, the air-fuel ratio control system further comprises operating environment parameter-detecting means for detecting an operating environment parameter indicative of an operating environment of the engine, and when the detected operating environment parameter is not within a predetermined range, the learned value-calculating means calculates the learned value of the variation correction coefficient, on a cylinder-by-cylinder basis, according to a value of the variation correction coefficient calculated when the detected operating environment parameter was within the predetermined range.

In general, when the operating environment of the engine is in an extreme condition, such as a very low outside air temperature, which can cause an unstable operating condition of the engine, there is a fear that the resulting unstable operating condition of the engine causes variation in the result of calculation of a parameter indicative of variation in air-fuel ratio between the cylinders, such as the variation correction coefficient of the present invention, so that there is a fear of being incapable of obtaining an appropriately calculated value of the parameter. In the air-fuel ratio control system according to the preferred embodiment, however, when the operating environment parameter is not within the predetermined range, the learned value of the variation correction coefficient is calculated according to a value of the variation correction coefficient calculated when the operating environment parameter was within the predetermined range. Therefore, by properly setting the predetermined range, even when the engine is in an operating environment, causing an unstable operating condition of the engine, the learned value can be calculated properly according to the value of the variation correction coefficient calculated when the engine was in an operating environment in which the operation of the engine was stable. As a result, it is possible to properly correct the variation in air-fuel ratio between the cylinders while avoiding adverse influence of the operating environment on the calculation, enhance the stability of the air-fuel ratio control, and maintain an excellent emission reduction rate of the catalyst.

To attain the above object, in a third aspect of the present invention, there is provided an air-fuel ratio control method for an internal combustion engine including a plurality of cylinders and an exhaust passage through which exhaust gases from the cylinders flow, the air fuel ratio control method including controlling an amount of fuel to be supplied to each of the cylinders, on a cylinder-by-cylinder basis, to thereby control an air fuel ratio of a mixture supplied to each cylinder.

The air-fuel ratio control method according to the third aspect of the present invention is characterized by comprising:

a fuel amount-determining step of determining an amount of fuel to be supplied to each cylinder;

a correction parameter-determining step of determining a correction parameter for correcting the amount of fuel to be supplied to each cylinder;

a first fuel amount-correcting step of correcting the determined amount of fuel to be supplied to each cylinder, according to the determined correction parameter;

an air-fuel ratio parameter-detecting step of detecting an air-fuel ratio parameter indicative of an air-fuel ratio of the exhaust gases flowing through the exhaust passage;

a variation parameter-calculating step of calculating a variation parameter indicative of a variation in air-fuel ratio between the plurality of parameters, on a cylinder-by-cylinder basis, based on a model parameter of a model formed by modeling each cylinder and having an input of the correction parameter and an output of the air-fuel ratio parameter;

an identification step of identifying the model parameter of the model based on the determined correction parameter and the detected air-fuel ratio parameter; and a second fuel amount-correcting step of further correcting the amount of fuel to be supplied to the plurality of cylinders on a cylinder-by-cylinder basis such that the variation parameter calculated on a cylinder-by-cylinder basis converges to a predetermined target value.

With the arrangement of the air-fuel ratio control method according to the third aspect of the present invention, it is possible to obtain the same advantageous effects as provided by the first aspect of the present invention.

Preferably, the air-fuel ratio control method further comprises a target value-setting step of setting an average value of the variation parameter to the predetermined target value.

Preferably, the correction parameter-determining step includes determining the correction parameter such that the air-fuel ratio parameter is caused to converge to a predetermined target air-fuel ratio value.

Preferably, the model parameter is of a model formed by modeling one of the plurality of cylinders, the correction parameter-determining step including determining the correction parameter based on the model parameter, and the first fuel amount-correcting step includes correcting the mount of fuel to be supplied to all of the plurality of cylinders according to the determined correction parameter.

Preferably, the second fuel amount-correcting step includes executing correction of the amount of fuel, based on one of an I-PD control algorithm and an IP-D control algorithm.

Preferably, the second fuel amount-correcting step executes correction of the amount of fuel, based on a response-specified control algorithm.

With the arrangements of these preferred embodiments, it is possible to obtain the same advantageous effects as provided by the corresponding preferred embodiments of the first aspect of the present invention.

To attain the above object, in a fourth aspect of the present invention, there is provided an air-fuel ratio control method for an internal combustion engine including a plurality of cylinders, the air fuel ratio control method including controlling an amount of fuel to be supplied to each of the cylinders, on a cylinder-by-cylinder basis, to thereby control an air fuel ratio of a mixture supplied to each cylinder.

The air-fuel ratio control method according to the fourth aspect of the present invention is characterized by comprising:

a first operating condition parameter-detecting step of detecting a first operating condition parameter indicative of an operating condition of the engine;

a fuel amount-determining step of determining an amount of fuel to be supplied to each cylinder;

a variation correction coefficient-calculating step of calculating a variation correction coefficient for correcting variation in air-fuel ratio between the plurality of cylinders, on a cylinder-by-cylinder basis;

a learned value-calculating step of calculating a learned value of the variation correction coefficient, on a cylinder-by-cylinder basis, according to the calculated variation correction coefficient and the detected first operating condition parameter; and a fuel amount-correcting step of correcting the determined amount of fuel to be supplied to each cylinder, according to the calculated learned value of the variation correction coefficient and the calculated variation correction coefficient.

With the arrangement of the air-fuel ratio control method according to the fourth aspect of the present invention, it is possible to obtain the same advantageous effects as provided by the second aspect of the present invention.

Preferably, the learned value-calculating step includes calculating the learned value of the variation correction coefficient, by a regression equation using the leaned value as a dependent variable and at the same time using the first operating condition parameter as an independent variable, and calculating a regression coefficient and a constant term of the regression equation by a sequential least-squares method.

Preferably, the air-fuel ratio control method further comprises a second operating condition parameter-detecting step of detecting a second operating condition parameter indicative of an operating condition of the engine, and the learned value-calculating step includes calculating, when the detected second operating condition parameter is not within a predetermined range, the learned value of the variation correction coefficient on a cylinder-by-cylinder basis according to a value of the variation correction coefficient calculated when the detected second operating condition parameter was within the predetermined range.

Preferably, the air-fuel ratio control method further comprises an operating environment parameter-detecting step of detecting an operating environment parameter indicative of an operating environment of the engine, and the learned value-calculating step includes calculating, when the detected operating environment parameter is not within a predetermined range, the learned value of the variation correction coefficient on a cylinder-by-cylinder basis according to a value of the variation correction coefficient calculated when the detected operating environment parameter was within the predetermined range.

With the arrangements of these preferred embodiments, it is possible to obtain the same advantageous effects as provided by the corresponding preferred embodiments of the second aspect of the present invention.

To attain the above object, in a fifth aspect of the present invention, there is provided an engine control unit including a control program for causing a computer to perform an air-fuel ratio control process for an internal combustion engine including a plurality of cylinders and an exhaust passage through which exhaust gases from the cylinders flow, the air fuel ratio control process including controlling an amount of fuel to be supplied to each of the cylinders, on a cylinder-by-cylinder basis, to thereby control an air fuel ratio of a mixture supplied to each cylinder.

The engine control unit according to the fifth aspect of the present invention is characterized in that the program causes the computer to determine an amount of fuel to be supplied to each cylinder, determine a correction parameter for correcting the amount of fuel to be supplied to each cylinder, correct the determined amount of fuel to be supplied to each cylinder, according to the determined correction parameter, detect an air-fuel ratio parameter indicative of an air-fuel ratio of the exhaust gases flowing through the exhaust passage, calculate a variation parameter indicative of a variation in air-fuel ratio between the plurality of parameters, on a cylinder-by-cylinder basis, based on a model parameter of a model formed by modeling each cylinder and having an input of the correction parameter and an output of the air-fuel ratio parameter, identify the model parameter of the model according to the determined correction parameter and the detected air-fuel ratio parameter, and further correct the amount of fuel to be supplied to the plurality of cylinders on a cylinder-by-cylinder basis such that the variation parameter calculated on a cylinder-by-cylinder basis converges to a predetermined target value.

With the arrangement of the engine control unit according to the fifth aspect of the present invention, it is possible to obtain the same advantageous effects as provided by the first aspect of the present invention.

Preferably, the program causes the computer to set an average value of the variation parameter to the predetermined target value.

Preferably, the program causes the computer to determine the correction parameter such that the air-fuel ratio parameter is caused to converge to a predetermined target air-fuel ratio value.

Preferably, the model parameter is of a model formed by modeling one of the plurality of cylinders, the program causing the computer to determine the correction parameter based on the model parameter, and when the program causes the computer to correct the amount of fuel to be supplied to each cylinder, the program causes the computer to correct the mount of fuel to be supplied to all of the plurality of cylinders according to the determined correction parameter.

Preferably, when the program causes the computer to further correct the amount of fuel to be supplied to the plurality of cylinders, on a cylinder-by-cylinder basis, the program causes the computer to correct the amount of fuel, based on one of an I-PD control algorithm and an IP-D control algorithm.

Preferably, when the program causes the computer to further correct the amount of fuel to be supplied to the plurality of cylinders, on a cylinder-by-cylinder basis, the program causes the computer to correct the amount of fuel, based on a response-specified control algorithm.

With the arrangements of these preferred embodiments, it is possible to obtain the same advantageous effects as provided by the corresponding preferred embodiments of the first aspect of the present invention.

To attain the above object, in a sixth aspect of the present invention, there is provided an engine control unit including a control program for causing a computer to perform an air-fuel ratio control process for an internal combustion engine including a plurality of cylinders, the air fuel ratio control process -including controlling an amount of fuel to be supplied to each of the cylinders, on a cylinder-by-cylinder basis, to thereby control an air fuel ratio of a mixture supplied to each cylinder.

The engine control unit according to the sixth aspect of the invention is characterized in that the program causes the computer to detect a first operating condition parameter indicative of an operating condition of the engine, determine an amount of fuel to be supplied to each cylinder, calculate a variation correction coefficient for correcting variation in air-fuel ratio between the plurality of cylinders, on a cylinder-by-cylinder basis, calculate a learned value of the variation correction coefficient, on a cylinder-by-cylinder basis, according to the calculated variation correction coefficient and the detected first operating condition parameter, and correct the determined amount of fuel to be supplied to each cylinder, according to the calculated learned value of the variation correction coefficient and the calculated variation correction coefficient.

With the arrangement of the engine control unit according to the sixth aspect of the present invention, it is possible to obtain the same advantageous effects as provided by the second aspect of the present invention.

Preferably, the program causes the computer to calculate the learned value of the variation correction coefficient, by a regression equation using the leaned value as a dependent variable and at the same time using the first operating condition parameter as an independent variable, and calculate a regression coefficient and a constant term of the regression equation by a sequential least-squares method.

Preferably, the program causes the computer to detect a second operating condition parameter indicative of an operating condition of the engine, and when the detected second operating condition parameter is not within a predetermined range, the program causes the computer to calculate the learned value of the variation correction coefficient on a cylinder-by-cylinder basis according to a value of the variation correction coefficient calculated when the detected second operating condition parameter was within the predetermined range.

Preferably, the program causes the computer to detect an operating environment parameter indicative of an operating environment of the engine, and when the detected operating environment parameter is not within a predetermined range, the program causes the computer to calculate the learned value of the variation correction coefficient on a cylinder-by-cylinder basis according to a value of the variation correction coefficient calculated when the detected operating environment parameter was within the predetermined range.

With the arrangements of these preferred embodiments, it is possible to obtain the same advantageous effects as provided by the corresponding preferred embodiments of the second aspect of the present invention.

The above and other objects, features, and advantages of the invention will become more apparent from the following detailed description taken in conjunction with the accompanying drawings.

BRIEF DESCRIPTION OF THE DRAWINGS

FIG. 3 is a diagram showing mathematical expressions useful for explaining an algorithm with which an STR (Self Turning Regulator) calculates a feedback correction coefficient KSTR;

FIG. 4 is a diagram showing mathematical expressions of a variation of the algorithm shown in FIG. 3;

FIG. 5 is a diagram showing mathematical expressions of an algorism with which the STR calculates the feedback correction coefficient KSTR, according to the embodiment;

FIG. 6 is a diagram showing mathematical expressions useful for explaining an algorithm with which an adaptive observer calculates a variation correction coefficient KAFOFT$_i$;

FIG. 7A is a diagram showing the relationship between an exhaust gas volume ESV and the variation correction coefficient KAFOFT$_i$;

FIG. 7B is a diagram showing the relationship between the exhaust gas volume ESV, and the variation correction coefficient KAFOFT$_i$ and a learned value KAFOFT_LS$_i$ thereof;

FIG. 8 is a diagram showing mathematical expressions useful for explaining an algorithm with which the adaptive observer calculates the learned value KAFOFT_LS$_i$ of the variation correction coefficient:

FIG. 16 is a diagram showing another example of an algorithm with which an adaptive observer calculates the variation correction coefficient $KAFOFT_i$.

DETAILED DESCRIPTION OF THE PREFERRED EMBODIMENTS

Figure 1:
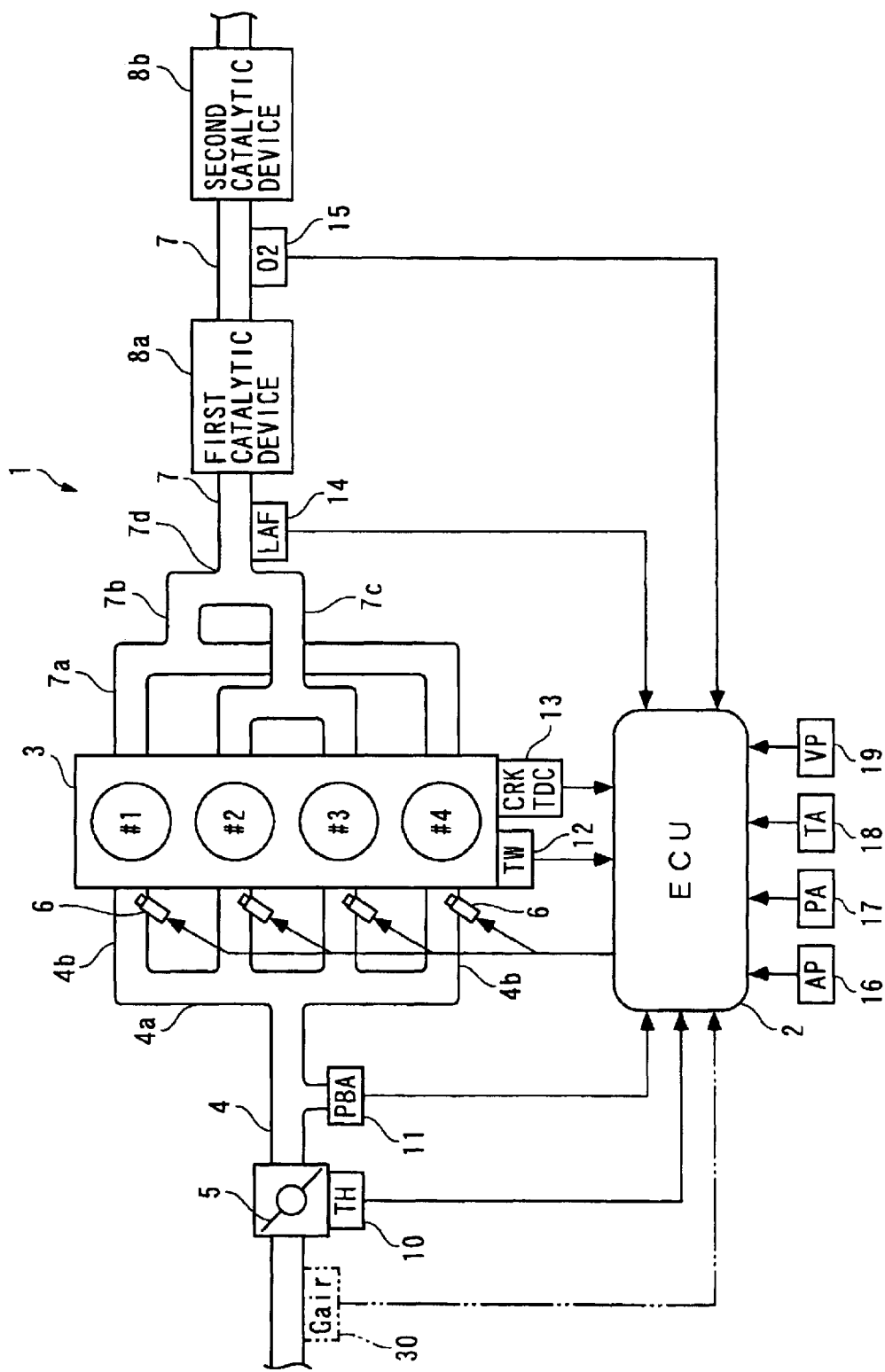
FIG. 1 is a block diagram schematically showing the arrangement of an air-fuel ratio control system according to an embodiment of the present invention and an internal combustion engine to which the air-fuel ratio control system is applied.

The invention will now be described in detail with reference to drawings showing a preferred embodiment thereof. Referring first to FIG. 1, there is schematically shown the arrangement of an air-fuel ratio control system 1 according to an embodiment of the present invention and an internal combustion engine 3 to which the air-fuel ratio control system 1 is applied. As shown in the figure, the air-fuel ratio control system 1 includes an ECU 2 which controls the amount of fuel injected into the internal combustion engine (hereinafter simply referred to as "the engine") 3 according to operating conditions of the engine 3, to thereby control the air-fuel ratio of the mixture, as described in detail hereinafter.

The engine 3 is an inline four-cylinder gasoline engine installed on an automotive vehicle, not shown, and has first to fourth cylinders #1 to #4 (a plurality of cylinders). In the vicinity of a throttle valve 5 disposed in an intake pipe 4 of the engine 3, there is provided a throttle valve opening sensor 10 implemented e.g. by a potentiometer, for detecting the degree of opening (hereinafter referred to as "throttle valve opening") TH of the throttle valve 5 and delivering an electric signal indicative of the sensed throttle valve opening TH to the ECU 2.

Further, an intake pipe absolute pressure sensor 11 is disposed at a location downstream of the throttle valve 5 in communication with the inside of the intake pipe 4. The intake pipe absolute pressure sensor 11 (first and second operating condition parameter-detecting means) is implemented e.g. by a semiconductor pressure sensor for detecting the intake pipe absolute pressure PBA (second operation condition parameter) within the intake pipe 4 and delivering an electric signal indicative of the sensed intake pipe absolute pressure PBA to the ECU 2.

The intake pipe 4 is connected to the four cylinders #1 to #4 via four branch portions 4b of an intake manifold 4a. In the branch portions 4b, injectors 6 are inserted at respective locations upstream of intake ports, not shown, for the cylinders. Each injector 6 is controlled as to a fuel injection amount defined by a time period over which the injector 6 is open, and fuel injection timing, by a drive signal delivered from the ECU 2 during operation of the engine 3.

Further, an engine coolant temperature sensor 12 (second operating condition parameter-detecting means) formed e.g. by a thermistor is mounted in the cylinder block of the engine 3. The engine coolant temperature sensor 12 senses an engine coolant temperature TW (second operating condition parameter) which is the temperature of an engine coolant circulating through the cylinder block of the engine 3 and delivering a signal indicative of the sensed engine coolant temperature TW to the ECU 2.

A crank angle position sensor 13 (first and second operating condition parameter-detecting means) is provided for a crankshaft, not shown, of the engine 3, for delivering a CRK signal and a TDC signal, which are both pulse signals, to the ECU 2 in accordance with rotation of the crankshaft.

Each pulse of the CRK signal is generated whenever the crankshaft rotates through a predetermined angle (e.g. 30 degrees). The ECU 2 determines a rotational speed (hereinafter referred to as "the engine speed") NE of the engine 3, based on the CRK signal. In the present embodiment, the engine speed NE corresponds to a second operating condition parameter. The TDC signal indicates that each piston, not shown, in an associated cylinder is in a predetermined crank angle position immediately before the TDC position at the start of the intake stroke, and each pulse of the TDC signal is generated whenever the crankshaft rotates through a predetermined angle.

On the other hand, the exhaust pipe 7 (exhaust passage) has an exhaust manifold 7a configured such that four exhaust pipe sections extending from the four cylinders #1 to #4 are combined into two collecting sections, and the two collecting sections are combined into one collecting section. That is, the exhaust manifold 7a is comprised of two exhaust pipe sections extending from the respective first and fourth cylinders #1, #4, a collecting section 7b into which these exhaust pipe sections are combined, two exhaust pipe sections extending from the respective second and third cylinders #2, #3, and a collecting section 7c into which these exhaust pipe sections are combined, and a collecting section 7d into which the two collecting sections 7b and 7c are combined, which are all formed in one piece. Due to such configuration, the exhaust manifold 7a has a lower resistance to the flow of exhaust gases than a conventional exhaust manifold in which four exhaust pipe sections are directly combined into one collecting section. This enables the engine 3 to deliver higher power output and higher torque, compared with those having the conventional exhaust manifold.

A first catalytic device 8a and a second catalytic devices 8b are arranged in the exhaust pipe 7 from upstream to downstream in the mentioned order in a spaced relationship at respective locations downstream of the collecting section 7d of the exhaust manifold 7a. Each catalytic device 8 is a combination of a NOx catalyst and a three-way catalyst, and the NOx catalyst is comprised of a honeycomb structure base, an iridium catalyst (sintered body of silicon carbide whisker carrying iridium and silica) coated on the surface of the honeycomb structure base, and Perovskite double oxide (sintered body of $LaCoO_3$ and silica) further coated on the iridium catalyst. The catalytic device 8 eliminates NOx from exhaust gases emitted during a lean burn operation of the engine 3 by oxidation-reduction catalytic actions of the NOx catalyst, and eliminates CO, HC, and NOx from exhaust gases emitted during other operations of the engine 3 than the lean burn operation by oxidation-reduction catalytic actions of the three-way catalyst.

An oxygen concentration sensor (hereinafter referred to as "the O2 sensor") 15 is inserted into the exhaust pipe 7 between the first and second catalytic devices 8a, 8b. The 02 sensor 15 is comprised of a zirconia layer and platinum electrodes, and delivers to the ECU 2 an output Vout dependent on the concentration of oxygen contained in exhaust gases downstream of the first catalytic device 8a. The output Vout (output from a controlled object) assumes a high-level voltage value (e.g. 0.8 V) when an air-fuel mixture having a richer air-fuel ratio than the stoichiometric air-fuel ratio has been burned, whereas it assumes a low-level voltage value (e.g. 0.2 V) when an air-fuel mixture having a leaner air-fuel ratio than the stoichiometric air-fuel ratio has been burned. Further, when the air-fuel ratio of the mixture is close to the stoichiometric air-fuel ratio, the output Vout assumes a predetermined target value Vop (e.g. 0.6 V) between the high-level and low-level voltage values.

Further, a LAF sensor 14 (air-fuel ratio parameter-detecting means) is mounted in the vicinity of the collecting section 7d of the exhaust manifold 7a. The LAF sensor 14 is formed by combining a sensor similar to the O2 sensor 15 and a detection circuit, such as a linearizer, and detects the concentration of oxygen contained in exhaust gases linearly over a wide range of the air-fuel ratio ranging from a rich region to a lean region, thereby delivering an output proportional to the sensed oxygen concentration to the ECU 2. The ECU 2 calculates a detected air-fuel ratio KACT (air-fuel ratio parameter) indicative of the air-fuel ratio of exhaust gases at the collecting section 7d based on the output from the LAF sensor 14. The output KACT is expressed as an equivalent ratio proportional to the reciprocal of the air-fuel ratio.

Further, the ECU 2 has an accelerator pedal opening sensor 16, an atmospheric pressure sensor 17, an intake air temperature sensor 18, and a vehicle speed sensor 19 connected thereto. The accelerator pedal opening sensor 16 detects a depression amount (hereinafter referred to as "the accelerator pedal opening") AP of an accelerator pedal, not shown, of the vehicle and delivers a signal indicative of the sensed accelerator pedal opening AP to the ECU 12. Further, the atmospheric pressure sensor 17, the intake air temperature sensor 18, and the vehicle speed sensor 19 detect atmospheric pressure AP, intake air temperature TA, and a vehicle speed VP, respectively, and delivers respective signals indicative of the detected atmospheric pressure AP, intake air temperature TA, and vehicle speed VP to the ECU 2. In the present embodiment, the intake air temperature sensor 18 and the vehicle speed sensor 19 correspond to operating environment parameter-detecting means, respectively, and the intake temperature and the vehicle speed VP correspond to operating environment parameters, respectively.

Next, the ECU 2 will be described. The ECU 2 is implemented by a microcomputer including an input/output interface, a CPU, a RAM, and a ROM (none of which is shown). The ECU 2 determines operating conditions of the engine 3, based on the outputs from the aforementioned sensors 10 to 19. Further, the ECU 2 executes an air-fuel ratio control process, which will be described in detail hereinafter, according to control programs read from the ROM, using data stored in the RAM, and the like, to thereby calculate a target air-fuel ratio KCMD (target air-fuel ratio value), a feedback correction coefficient KSTR, a variation correction coefficient KAFOFT$_i$ and a learned value KAFOFT_LS$_i$ thereof. Furthermore, as described hereinafter, based on these calculated values of KCMD KSTR, KAFOFT$_i$, KAOFT_LS$_i$, and so forth, the ECU 2 calculates the final fuel injection amount TOUT$_i$ of each injector 6, on a cylinder-by-cylinder basis, and drives the injector 6 by a drive signal generated based on the calculated final fuel injection amount TOUT$_i$, to thereby control the air-fuel ratio of the mixture on a cylinder-by-cylinder basis. It should be noted that the subscript "$i$" in TOUT$_i$ is a cylinder number indicative of a number assigned to each cylinder (i=1 to 4), and this also applies to the aforementioned variation correction coefficient KAFOFT$_i$, and the learned value KAFOFT_LS$_i$, and parameters referred to hereinafter.

It should be noted that in the present embodiment, the ECU 2 forms fuel amount-determining means, correction parameter-determining means, first fuel amount-correcting means, air-fuel ratio parameter-detecting means, variation parameter-calculating means, identification means, second fuel amount-correcting means, target value-setting means, first operating condition parameter-detecting means, variation correction coefficient-calculating means, learned value-calculating means, fuel amount-correcting means, second operating condition parameter-detecting means, and operating environment parameter-detecting means.

Figure 2:
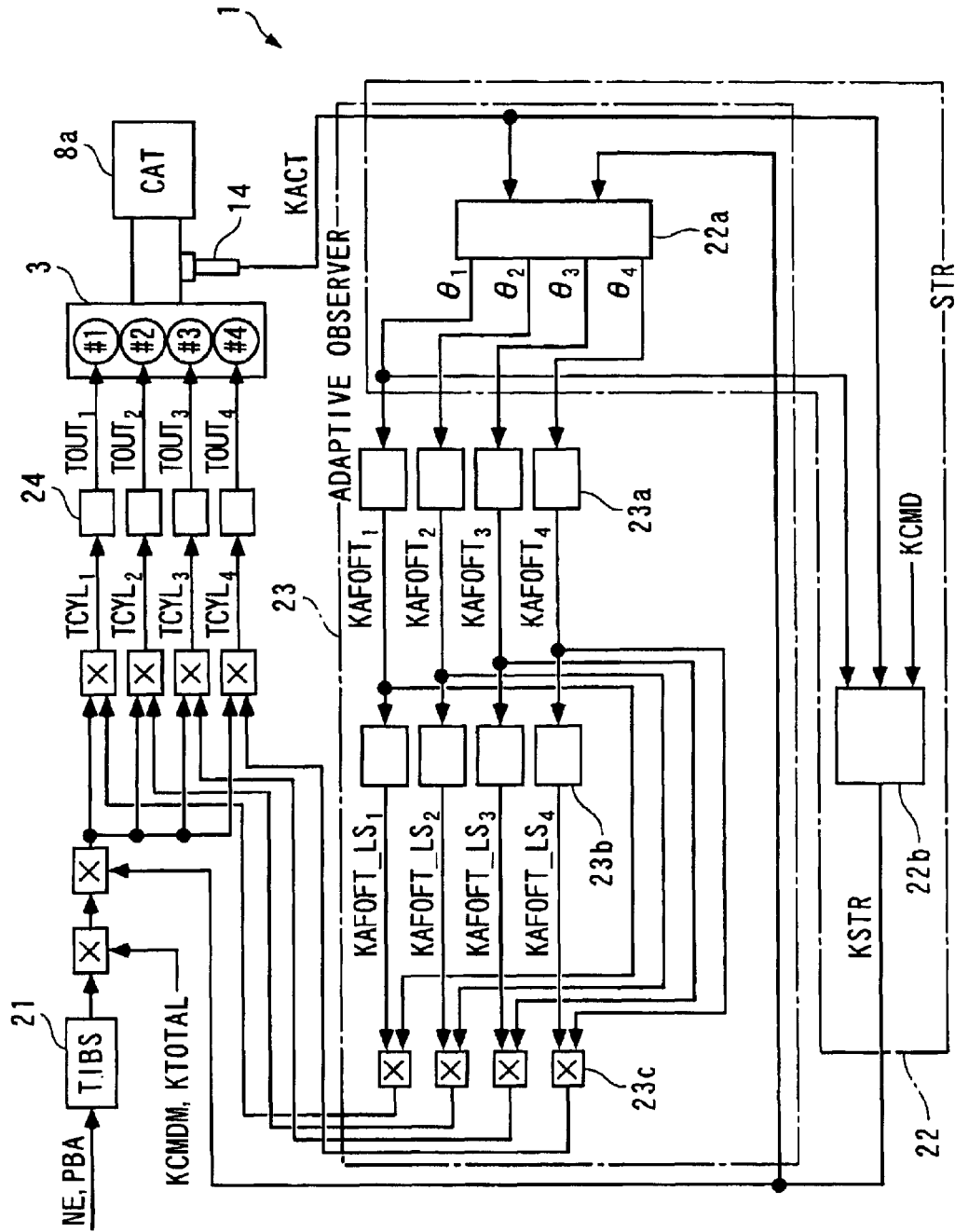
FIG. 2 is a block diagram showing the arrangement of the air-fuel ratio control system.

As shown in FIG. 2, the air-fuel ratio control system 1 is comprised of a basic fuel injection amount-calculating section 21, an STR (Self Tuning Regulator) 22, an adaptive observer 23, and an attachment-dependent correcting section 24, which are all implemented by the ECU 2. In the air-fuel ratio control system 1, the basic fuel injection amount-calculating section 21 calculates a basic fuel injection amount TIBS according to the engine speed NE and the intake pipe absolute pressure PBA by searching a map, not shown.

Further, as described in detail hereinafter, the STR 22 calculates the feedback correction coefficient KSTR, and the adaptive observer 23 calculates the variation correction coefficient KAFOFT$_i$ and the learned value KAFOFT_LS$_i$ thereof, on a cylinder-by-cylinder basis. Then, a demanded fuel injection amount TCYL$_i$ is calculated on a cylinder-by-cylinder basis by multiplying the basic fuel injection amount TIBS by a corrected target air-fuel ratio KCMDM, a total correction coefficient KTOTAL, the feedback correction coefficient KSTR, the variation correction coefficient KAFOFT$_i$, and the learned value KAFOFT_LS$_i$ thereof. Then, the attachment-dependent correcting section 24 calculates a final fuel injection amount TOUT$_i$, on a cylinder-by-cylinder basis, based on the demanded fuel injection amount TCYL$_i$, calculated on a cylinder-by-cylinder basis.

Next, the above-mentioned STR 22 (correction parameter-determining means) will be described. The STR 22 is comprised of an onboard identifier 22a (identification means) and an STR controller 22b. In the STR 22, the onboard identifier 22a identifies a model parameter vector θ$_i$ by an algorithm described in detail hereinafter, and the STR controller 22b calculates the feedback correction coefficient KSTR (correction parameter).

First, the first to fourth cylinders #1 to #4 are each regarded as a controlled object to which is inputted an associated feedback correction coefficient KSTR$_i$ and from which is outputted the detected air-fuel ratio KACT, and the system including these controlled objects is modeled into a discrete-time system model, which is expressed by an equation (1) appearing in FIG. 3. In the equation (1), the symbol k represents a discretized time, and each portion with (k) represents discrete data sampled every combustion cycle, i.e. whenever a total of four successive pulses of the TDC signal are generated. This also applies to discrete data (time-series data) referred to hereinafter.

The dead time of the detected air-fuel ratio KACT with respect to the target air-fuel ratio KCMD is estimated to correspond to about three combustion cycles, and therefore, there is a relationship of KCMD(k)=KACT(k+3). When this relationship is applied to the equation (1), there is derived an equation (2) in FIG. 3.

Further, the model parameter vector θ$_i$(k) of model parameters b0$_i$(k), r1$_i$(k), r2$_i$(k), r3$_i$(k), and sO$_i$(k) in the equation (1) is identified with an identification algorithm of equations (3) to (9) in FIG. 3. KP$_i$(k) in the equation (3) represents a vector of a gain coefficient, and ide$_i$(k) an identification error. Further, θ$_i$(k)$^T$ in the equation (4) represents a transposed matrix of θ$_i$(k). It should be noted in the following description, the notation of "vector" is omitted unless otherwise required.

The identification error ide$_i$(k) in the equation (3) is calculated using the equations (5) to (7) in FIG. 3, and KACT_HAT$_i$(k) in the equation (6) represents an identified value of the detected air-fuel ratio KACT. Further, the vector KP$_i$(k) of the gain coefficient is calculated using the equation (8) in FIG. 3, and P$_i$(k) in the equation (8) is a square matrix of order 5 defined by an equation (9) in FIG. 3.

Assuming that the air-fuel ratio control is executed by calculating the feedback correction coefficient KSTR$_i$(k) on a cylinder-by-cylinder basis using the algorithm expressed by the equations (2) to (9), and correcting variation in air-fuel ratio between the cylinders using the cylinder-by-cylinder feedback correction coefficient KSTR$_i$(k), when the engine 3 is in a cruising condition, the cylinder-by-cylinder feedback correction coefficient KSTR$_i$(k) sometimes drifts to make the control system unstable, which can cause lowering of the emission reduction rate of the catalyst and combustion fluctuation. The reason for this is as follows: For example, when the feedback correction coefficient KSTR$_i$(k) for the first cylinder #1 is calculated, and the fuel injection amount is corrected based thereon, this has influence on the detected air-fuel ratio KACT(k) used for calculation for the other cylinders, but not on calculation of the feedback correction coefficients KSTR$_{2-4}$(k) for the other cylinders. Therefore, when the feedback correction coefficient KSTR is calculated on a cylinder-by-cylinder basis with a high gain, an error in the identification of the model parameter vector θ$_i$(k) can occur, which causes the feedback correction coefficient KSTR to drift, making the control system unstable. Therefore, in the STR 22 of the present embodiment, with a view to causing the detected air-fuel ratio KACT to become equal to the target air-fuel ratio KCMD, but not with a view to correcting variation in the air-fuel ratio between the cylinders, the feedback correction coefficient KSTR is calculated as follows:

In the STR controller 22b according to the present embodiment, the model parameter vector θ$_i$ of the first cylinder #1 identified by the onboard identifier 22a is oversampled in timing synchronous with generation of the TDC signal, and at the same time, a moving average value θ_ave of the model parameter vector θ$_1$ is calculated. More specifically, the moving average value θ_ave of the model parameter vector θ$_1$ is calculated using an equation (10) in FIG. 4, and the feedback correction coefficient KSTR (n) is calculated using the moving average value θ_ave by an equation (12) in FIG. 4. It should be noted that θbuf in the equation (10) indicates an oversampled value of the model parameter vector θ$_1$ for the first cylinder #1, and the moving average value θ_ave(n) is defined by an equation (11) in FIG. 4. In these equation (10) to (12), the symbol n represents a discretized time, and each portion with (n) represents discrete data sampled in timing synchronous with generation of each pulse of the TDC signal. This also applies to discrete data referred to hereinafter. Therefore, there is a relationship of k–f=n–4·f (f: integer), and when this relationship is applied to the equation (2) in FIG. 3, there is derived the above equation (12).

Further, the symbol m in the equation (10) represents a predetermined integer, and in the present embodiment, m is set to 11. The reason for this is as follows: As described hereinabove, the dead time of the detected air fuel ratio KACT with respect to the target air-fuel ratio KCMD corresponds to three combustion cycles, and therefore, the frequency of resonance of the control system caused by updating the model parameter vector θ also corresponds to three cycles of the combustion. Therefore, for suppressing the oscillation of the control system, a 12-tap moving average filter is optimal which has stop bands at intervals corresponding to the three cycles of the combustion, and therefore, m is set to 11, as described above.

The identifying algorithm for identifying the model parameter vector θ$_i$(k) is expressed by equations (13) to (19) in FIG. 4. However, when the model parameter vector θ$_i$(k) is identified by the identifying algorithm, the computational load on the CPU of the ECU 2 becomes too large. To avoid this inconvenience, the onboard identifier 22a according to the present embodiment identifies the model parameter vector θ$_i$(k) by an identifying algorithm based on a fixed gain method, which is expressed by equations (20) to (26) in FIG. 5. It should be noted that in the equation (20) in FIG. 5, σf is a forgetting vector defined by an equation (26) in FIG. 5, and in an equation (25), Pf represents an identification gain (fixed gain). The forgetting vector σf is used for preventing a drift of the model parameter from occurring when the load on the engine 3 is substantially constant, e.g. during cruising of the vehicle.

As described above, in the STR 22 of the air-fuel ratio control system according to the present embodiment, the onboard identifier 22a identifies the model parameter vector θ$_i$(k) by the identifying algorithm expressed by the equations (20) to (26) in FIG. 5, and the STR controller 22b calculates the feedback correction coefficient KSTR (n) using the equations (10) to (12) in FIG. 4.

Next, the adaptive observer 23 (variation parameter-calculating means, variation correction coefficient-calculating means, learned value-calculating means) will be described. The adaptive observer 23 is comprised of the onboard identifier 22a, a variation correction coefficient-calculating section 23a, a learned value-calculating section 23b, and a multiplication section 23c. In the adaptive observer 23, using an algorithm described hereinafter, the variation correction coefficient-calculating section 23a calculates the variation correction coefficient KAFOFT$_i$, on a cylinder-by-cylinder basis, and the learned value-calculating section 23b calculates the learned value KAFOFT_LS$_i$ of the variation correction coefficient. Further, the multiplication section 23c multiplies the variation correction coefficients KAFOFT$_1$, to KAFOFT$_4$ by the learned values KAFOFT_LS$_1$, to KAFOFT_LS$_4$, respectively.

First, a description will be given of an algorithm for calculation of the variation correction coefficient KAFOFT$_i$ on a cylinder-by-cylinder basis, by the variation correction coefficient-calculating section 23a. In the model expressed by the equation (1) in FIG. 3, assuming that the detected air-fuel ratio KACT assumes a value KACT' in a steady operating condition, and the feedback correction coefficient KSTR assumes a fixed value KSTR', an equation (27) in FIG. 6 holds. When the equation (27) is rearranged with respect to KACT' and KSTR', there is obtained an equation (29) in FIG. 6. In this equation (29), the coefficient of KSTR' on the right side represents the relationship (ratio) between an input and an output concerning each cylinder, in other words, a constant variation in air fuel ratio (air-fuel ratio deviation) between the cylinders.

Therefore, in the present embodiment, in the case where the model parameter vector θ$_i$ is defined as in the equation (21) in FIG. 5, a variation coefficient AFOFT$_i$ (variation parameter) representative of a variation in air-fuel ratio between the cylinders is defined by an equation (30) in FIG. 6. Further, the variation coefficient AFOFT$_i$ is oversampled in timing synchronous with the timing of occurrence of each pulse of the TDC signal, and a moving average value AFOFTAVE (predetermined target value, average value of the variation parameter) thereof is calculated. That is, the moving average value AFOFTAVE is calculated using an equation (31) in FIG. 6. It should be noted that in this equation (31), the cylinder number mc is set to 4 in the present embodiment.

Further, the variation correction coefficient KAFOFT$_i$ is calculated by I-PD control (proportional and differential-advanced type PID control) algorithm on a cylinder-by-cylinder basis. The I-PD control algorithm is expressed by equations (32) and (33) in FIG. 6. It should be noted that the symbol e(n) in the equation (33) represents a variation error in air-fuel ratio between the cylinders. The variation correction coefficient $KAFOFT_i$ is thus calculated by the I-PD control algorithm so as to prevent a overshooting behavior from occurring when the variation coefficient $AFOFT_i$ (n) is converged to the moving average value AFOFTAVE. By the algorithm expressed by the above equations (30) to (33), the variation correction coefficient-calculating section 23a calculates the variation correction coefficient $KAFOFT_i$, on a cylinder-by-cylinder basis.

Next, a description will be given of an algorithm for calculation of the learned value $KAFOFT\_LS_i$ of the variation correction coefficient $KAFOFT_i$ by the learned value-calculating section 23b. The variation correction coefficient $KAFOFT_i$ is susceptible to operating conditions of the engine 3, and when the operating conditions of the engine 3 are changed, the coefficient $KAFOFT_i$ is changed accordingly. FIG. 7A shows the relationship between an exhaust gas volume ESV(n) as a first operating condition parameter indicative of an operating condition of the engine and the variation correction coefficient $KAFOFT_i(n)$. This exhaust gas volume ESV(n) is an estimated value of the space velocity, and calculated using an equation (34) in FIG. 8. It should be noted that in the equation (34), SPVRA represents a predetermined coefficient determined in advance by the displacement of the engine 3.

Referring to FIG. 7A, it can be seen that an approximate value i.e. estimated value of the variation correction coefficient $KAFOFT_i(n)$ can be calculated by a first-degree equation using the variation correction coefficient $KAFOFT_i$ (n) as a dependent variable and the exhaust gas volume ESV(n) as an independent variable (see FIG. 7B). Therefore, in the learned value-calculating section 23b, the learned value $KAFOFT\_LS_i(n)$ of the variation correction coefficient is defined as an estimated value calculated by a regression equation expressed by an equation (35) in FIG. 8, and a vector $\theta AFOFT\_LS_i(n)$ of a regression coefficient $AAFOFT\_LS_i$ and a constant term $BAFOFT\_LS_i$ (hereinafter referred to as "the regression coefficient vector") is calculated by a sequential least-squares method expressed by equations (36) to (42) in FIG. 8.

In this equation (36). $KQ_i(n)$ represents a vector of a gain coefficient, and $Eaf_i(n)$ represents an error. Further, the error $Eaf_i(n)$ is calculated using an equation (38) in FIG. 8. Further, the vector $KQ_i(n)$ of the gain coefficient is calculated using an equation (41) in FIG. 8, and $Q_i(n)$ in this equation (41) is a square matrix of order 2 defined by an equation (42) in FIG. 8.

Further, the learned value $KAFOFT\_LS_i(n)$ is more specifically calculated using an equation (43) in FIG. 8. It should be noted that when the engine 3 is in an extreme operating condition or operating environment, the calculation of the regression coefficient $AAFOFT\_LS_i$ and the constant term $BAFOFT\_LS_i$ by the sequential least-squares method is avoided, and the preceding value $\theta AFOFT\_LS_i$ (n−1) of the regression coefficient vector is used as the current value $\theta AFOFT\_LS_i(n)$ in calculation of the learned value $KAFOFT\_LS_i(n)$.

With the algorithm expressed by the equations (34) and (36) to (43), the learned value-calculating section 23b calculates the learned value $KAFOFT\_LS_i(n)$ such that the product of the learned value $KAFOFT\_LS_i(n)$ and the variation correction coefficient $KAFOFT_i(n)$ converges to the learned value $KAFOFT\_LS_i(n)$. This makes it possible to suppress hunting of the product of the learned value $KAFOFT\_LS_i(n)$ and the variation correction coefficient $KAFOFT_i(n)$, the basic fuel injection amount TIBS being multiplied by the product.

Figure 9:
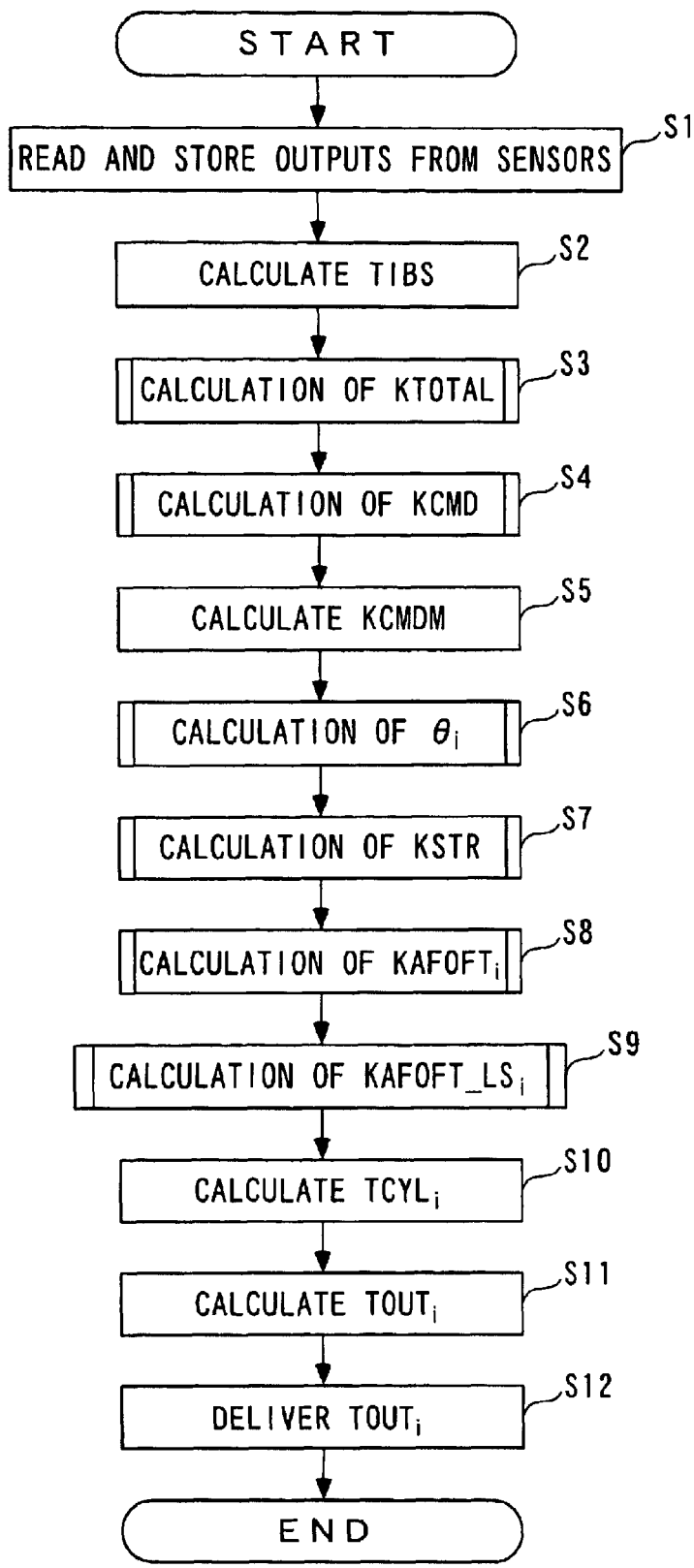
FIG. 9 is a flowchart showing a fuel injection control process including an air-fuel ratio control process.

In the following, a process of calculating a fuel injection amount, which is executed by the ECU 2, will be described with reference to FIGS. 9 to 13. In the following description, the symbols (k) and (n) indicating that associated values are the current values are omitted when deemed appropriate. FIG. 9 shows a main routine for carrying out the control process, which is executed by an interrupt handling routine in synchronism with inputting of each pulse of the TDC signal. In this process, a final fuel injection amount $TOUT_i$ (amount of fuel to be supplied to each cylinder) is calculated, on a cylinder-by-cylinder basis, as will be described hereinafter.

First, in a step 1 (in FIG. 9, abbreviated to S1; this rule also applies to the other steps referred to hereinafter), outputs from the sensors 10 to 19 described hereinbefore are read in and stored in the RAM.

Then, the process proceeds to a step 2, wherein the basic fuel injection amount TIBS is calculated. In this process, the basic fuel injection amount TIBS is calculated by searching a map, not shown, according to the engine rotational speed NE and the intake pipe absolute pressure PBA.

Then, the process proceeds to a step 3, wherein a total correction coefficient KTOTAL is calculated. The total correction coefficient KTOTAL is obtained by calculating various correction coefficients by searching tables and maps according to various operating parameters (e.g. the intake air temperature TA, the atmospheric pressure PA, the engine coolant temperature TW, the accelerator pedal opening AP, throttle valve opening TH, and so forth) and then multiplying the thus calculated correction coefficients by each other.

Next, the program proceeds to a step 4, wherein the target air-fuel ratio KCMD is calculated. The process for calculation of the target air-fuel ratio KCMD is not shown here, but is executed by the same control method as described in Japanese Laid-Open Patent Publication (Kokai) No. 2000-179385. That is, the target air-fuel ratio KCMD is calculated depending on the operating conditions of the engine 3, by a sliding mode control process or a map retrieval process such that the output Vout from the O2 sensor 15 converges to a predetermined target value Vop.

Then, the program proceeds to a step 5, wherein a corrected target air-fuel ratio KCMDM is calculated. The corrected target air-fuel ratio KCMDM is for compensating for a change in charging efficiency due to a change in the air-fuel ratio A/F. The corrected target air-fuel ratio KCMDM is calculated by searching a table, not shown, according to the target air-fuel ratio KCMD calculated in the step 4.

Next, in steps 6 and 7, the cylinder-by-cylinder model parameter vector $\theta_i$ and the feedback correction coefficient KSTR are calculated, respectively. Processes for calculating these parameters will be described in detail hereinafter.

In the following steps 8 and 9, the cylinder-by-cylinder variation correction coefficient $KAFOFT_i$ and learned value $KAFOFT\_LS_1$ thereof are calculated, respectively. Processes for calculating these parameters will be described in detail hereinafter.

Then, the program proceeds to a step 10, wherein the cylinder-by-cylinder demanded fuel injection amount $TCYL_i$ is calculated using the basic fuel injection amount TIBS, the total correction coefficient KTOTAL, the corrected target air-fuel ratio KCMDM, the feedback correction coefficient KSTR, the variation correction coefficient $KAFOFT_i$, and the learned value $KAFOFT\_LS_1$ thereof, by the following equation (44):

$$TCYL_1 = TIBS \cdot KTOTAL \cdot KCMDM \cdot KSTR \cdot KAFOFT_1 \cdot KAFOFT\_LS_i \quad \ldots (44)$$

Then, the program proceeds to a step 11, wherein the cylinder-by-cylinder final fuel injection amount $TOUT_i$ is calculated by subjecting the cylinder-by-cylinder demanded fuel injection amount $TCYL_i$ to the fuel attachment correction. More specifically, the cylinder-by-cylinder final fuel injection amount $TOUT_i$ is calculated by calculating a ratio of an amount of fuel attached to the inner wall of the combustion chamber to the whole amount of fuel injected from the injectors 6 during the current combustion cycle, and correcting the cylinder-by-cylinder demanded fuel injection amount $TCYL_i$ based on the ratio thus calculated.

Then, the program proceeds to a step 12, wherein the drive signal based on the cylinder-by-cylinder final fuel injection amount $TOUT_i$ calculated as described above is delivered to one of the injectors 6 associated with the present cylinder for which the current calculation is performed, followed by terminating the present process.

Figure 10:
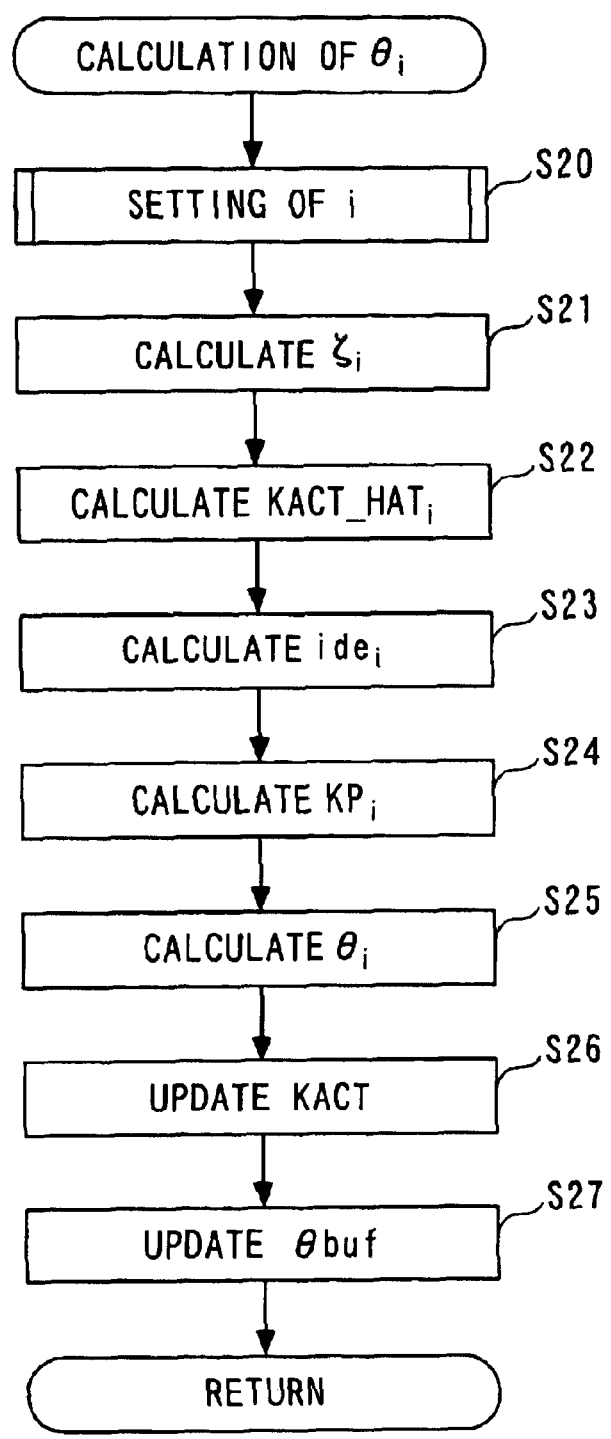
FIG. 10 is a flowchart showing a process for calculating a model parameter vector $\theta_j$, executed in a step 6 in FIG. 9.

Next, the process for calculating the cylinder-by-cylinder model parameter vector $\theta_i$ executed in the step 6 will be described with reference to FIG. 10. In this process, first, in a step 20, there is carried out a process for setting the cylinder number value i which corresponds to the subscript "$_i$" in each parameter.

In this process, the cylinder number value i is set based on the immediately preceding value PRVi thereof set in the immediately preceding loop as follows: When PRVi=1 holds, the cylinder number value i set to 3, when PRVi=2 holds, the same is set to 1, when PRVi=3 holds, the same is set to 4, and when PRVi=4 holds, the same is set to 2. Further, the initial value of the cylinder number value i is set to a value of 1. That is, the cylinder number value i is cyclically set in the order of $1 \rightarrow 3 \rightarrow 4 \rightarrow 2 \rightarrow 1$ $3 \rightarrow 4 \rightarrow 2 \rightarrow 1 \ldots$.

Then, the program proceeds to a step 21, wherein the feedback correction coefficient KSTR and a vector $f_i$ of the detected air-fuel ratio KACT are calculated using the equation (24) in FIG. 5, referred to hereinbefore, and then in a step 22, the identified value $KACT\_HAT_i$ of the detected air-fuel ratio KACT is calculated using the equation (23) in FIG. 5, referred to hereinbefore.

Then, the program proceeds to a step 23, wherein the identification error $ide_i$ is calculated using the equation (22) in FIG. 5, referred to hereinbefore, and then in a step 24, the vector $KP_i$ of the gain coefficient is calculated using the equation (25) in FIG. 5, referred to hereinbefore. Then, the program proceeds to a step 25, wherein the model parameter vector $\theta_i$ is calculated using the equation (20) in FIG. 5.

Then, the program proceeds to a step 26, wherein a predetermined number (twelve, in the present embodiment) of values of the detected air-fuel ratio KACT calculated on and before the immediately preceding occasion, stored in the RAM, are updated. More specifically, each value of the detected air-fuel ratio KACT stored in the RAM is set to an older value by one control cycle of the fuel injection control. For example, the current value KACT(n) is set to the immediately preceding value KACT(n−1), and the immediately preceding value KACT(n−1) is set to the second preceding value KACT(n−2), and so forth.

Then, the program proceeds to a step 27, wherein a predetermined number (twelve, in the present embodiment) of oversampling values $\theta buf$ of the model parameter vector $\theta_1$ of the first cylinder #1, stored in the RAM, are updated. More specifically, similarly to the step 26, each of the oversampling values $\theta buf$ stored in the RAM is set to an older value by one control cycle of the fuel injection control. For example, the current oversampling value $\theta buf(n)$ is set to the immediately preceding oversampling value $\theta buf(n-1)$, and the immediately preceding oversampling value $\theta buf(n-1)$ is set to the second preceding oversampling value $\theta buf(n-2)$, and so forth, followed by terminating the present process.

Figure 11:
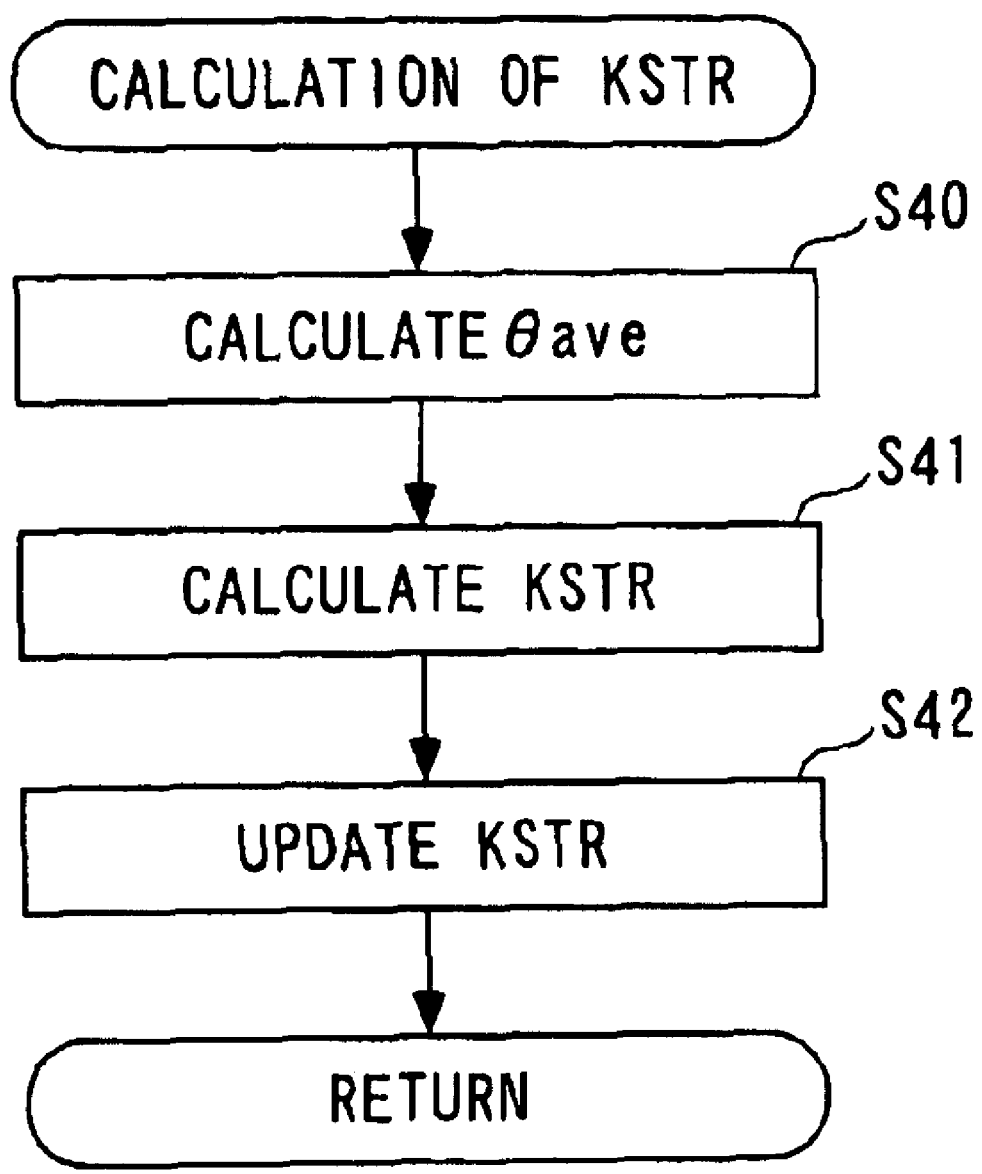
FIG. 11 is a flowchart showing a KSTR-calculating process executed in a step 7 in FIG. 9.

Next, the process for calculating the feedback correction coefficient KSTR in the step 7 will be described with reference to FIG. 11. In this process, first, in a step 40, the moving average value $\theta\_ave$ is calculated based on the oversampling values $\theta buf$ updated in the step 27, using the equation (10) in FIG. 4.

Then, in a step 41, the feedback correction coefficient KSTR is calculated based on the moving average value $\theta\_ave$ calculated in the step 41, by the equation (12) in FIG. 4, referred to hereinbefore.

Then, the program proceeds to a step 42, wherein a predetermined number (twelve in the present embodiment) of values of the feedback correction coefficient KSTR calculated in the preceding loops, which are stored in the RAM, are updated. More specifically, each value of the feedback correction coefficient KSTR is set to an older value by one control cycle. For example, the current value KSTR(n) is set to the immediately preceding value KSTR(n−1), and the immediately preceding value KSTR(n−1) is set to the second preceding value KSTR(n−2). Then, the present process is terminated.

Figure 12:
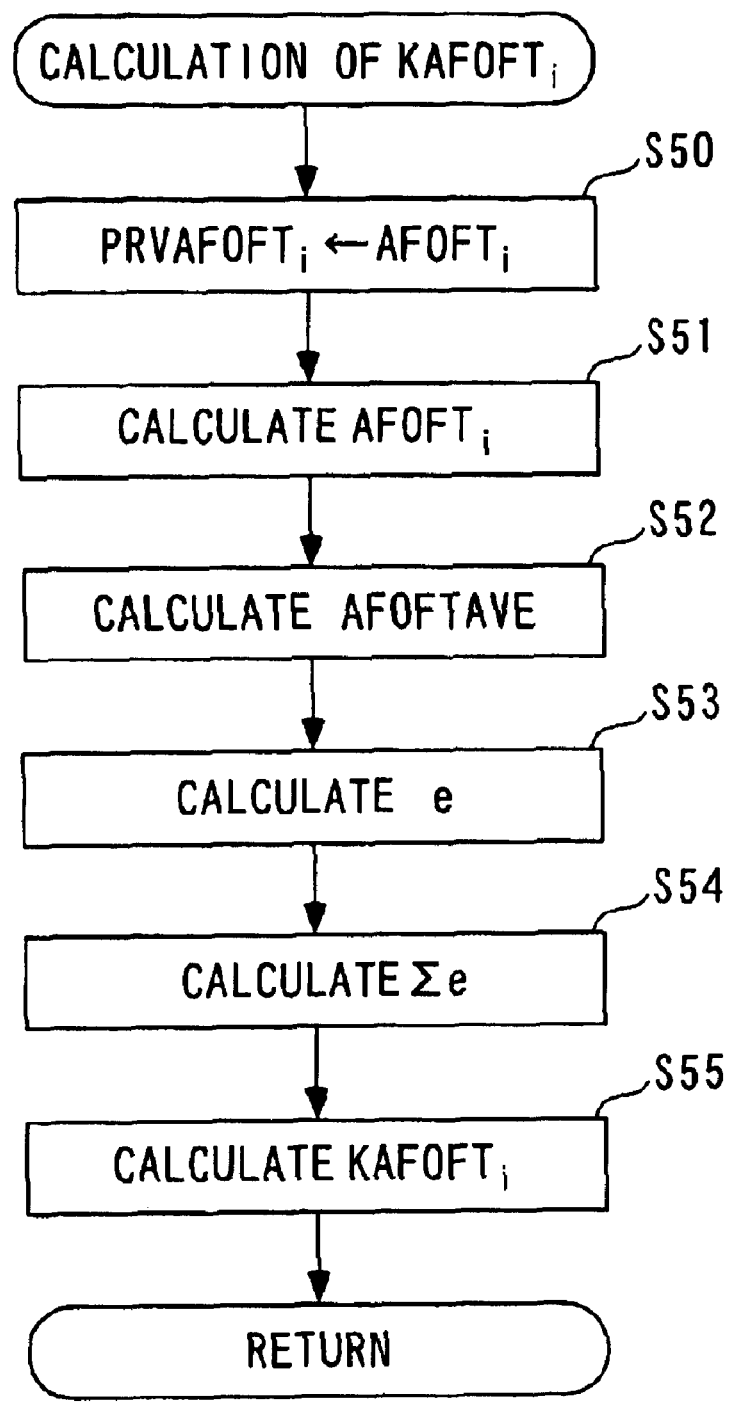
FIG. 12 is a flowchart showing a process for calculating the variation correction coefficient KAFOFT$_i$, executed in a step 8 in FIG. 9.

Next, the process for calculating the variation correction coefficient $KAFOFT_i$ in the step 8 will be described with reference to FIG. 12. In this process, first, in a step 50, the value of the variation coefficient $AFOFT_i$ calculated in the immediately preceding loop, which is stored in the RAM, is set to the immediately preceding value $PRVAFOFT_i$ of the variation coefficient.

Then, the program proceeds to a step 51, wherein the variation coefficient $AFOFT_i$ is calculated using the equation (30) in FIG. 6, and then in a step 52, the moving average value AFOFTAVE of the variation coefficient is calculated using the equation (31) in FIG. 6, referred to hereinbefore.

Then, the program proceeds to a step 53, wherein a following error e is calculated using the equation (33) in FIG. 6, referred to hereinbefore, and then in a step 54, the integral value $\Sigma e$ of the following error e is calculated. Then, the program proceeds to a step 55, wherein the variation correction coefficient $KAFOFT_i$ is calculated by the equation (32) in FIG. 6, referred to hereinbefore, using the variation coefficient $AFOFT_i$ and the integral value $\Sigma e$ of the following error e, calculated in the steps 51 and 54, respectively, followed by terminating the present process.

Figure 13:
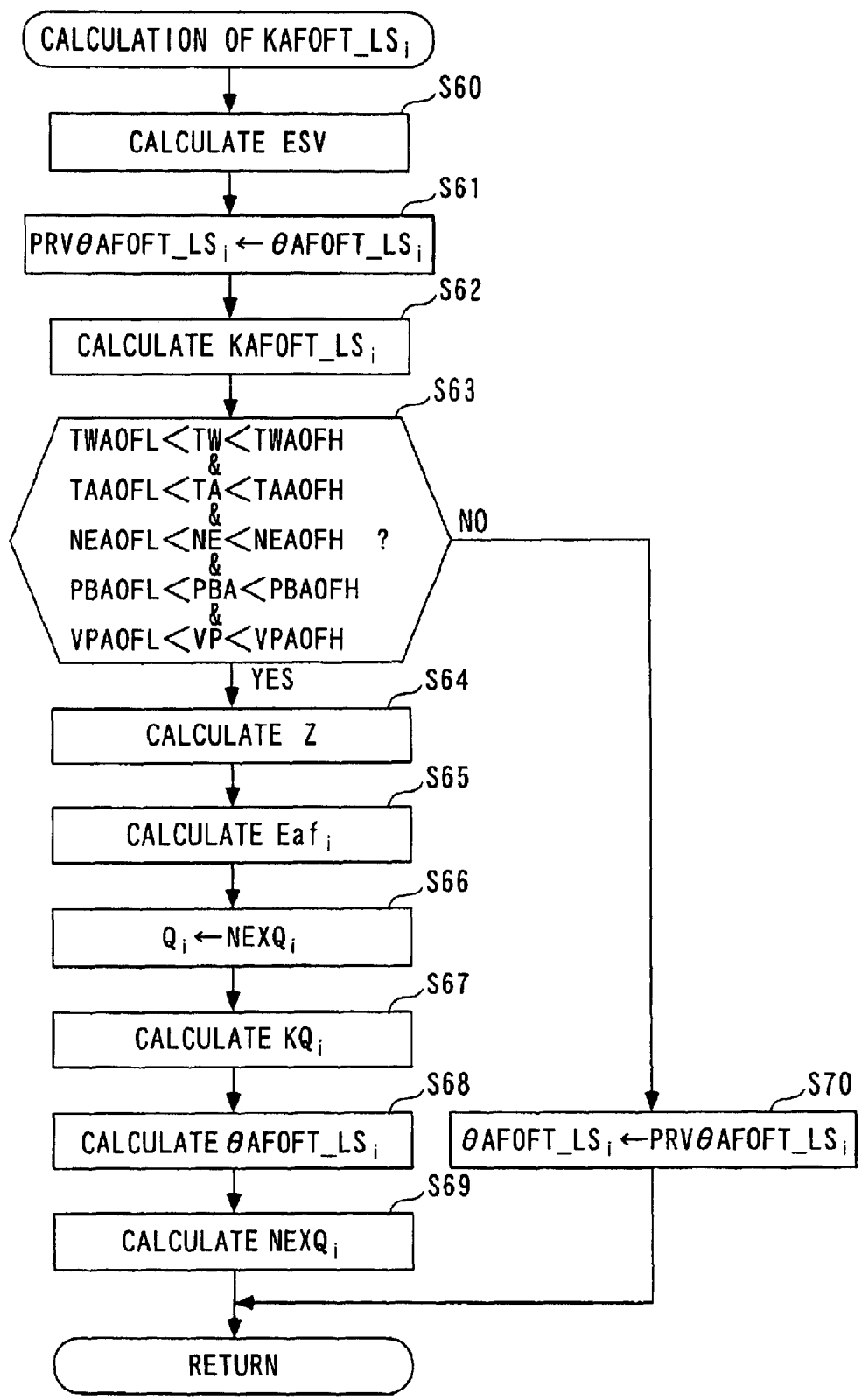
FIG. 13 is a flowchart showing a process for calculating the learned value KAFOFT_LS$_i$ of the variation correction coefficient, executed in a step 9 in FIG. 9.

Next, the process for calculating the learned value $KAFOFT\_LS_i$ of the variation correction coefficient in the step 9 will be described with reference to FIG. 13. In this process, first, in a step 60, the exhaust gas volume ESV is calculated using the equation (34) in FIG. 8, referred to hereinbefore.

Then, the program proceeds to a step 61, wherein the value of the regression coefficient $\theta AFOFT\_LS_i$ calculated in the preceding loop is set to the immediately preceding value $PRV\theta AFOFT\_LS_i$ [$=\theta AFOFT\_LS_i(n-1)$] thereof.

Then, the program proceeds to a step 62, wherein the learned value $KAFOFT\_LS_i$ is calculated using the equation (43) in FIG. 8, referred to hereinbefore. Thereafter, the program proceeds to a step 63, wherein it is determined whether or not the following five conditions (A) to (E) are satisfied:

(A) The engine coolant temperature TW is higher than a predetermined lower limit value TWAOFL and at the same time lower than a predetermined higher limit value TWAOFH.

(B) The intake air temperature TA is higher than a predetermined lower limit value TAAOFL and at the same time lower than a predetermined higher limit value TWAOFH.

(C) The engine speed NE is higher than a predetermined lower limit value NEAOFL and at the same time lower than a predetermined higher limit value NEAOFH.

(D) The intake pipe absolute pressure PBA is higher than a predetermined lower limit value PBAOFL and at the same time lower than a predetermined higher limit value PBAOFH.

(E) The vehicle speed VP is higher than a predetermined lower limit value VPAOFL and at the same time lower than a predetermined higher limit value VPAOFH.

When all of the five conditions (A) to (E) are satisfied, it is judged that the engine is in an operating condition in which the regression coefficient vector $\theta\text{AFOFT\_LS}_i$ should be calculated by the sequential least-squares method, so that the program proceeds to a step 64, wherein a vector Z of the exhaust gas volume is calculated using the equation (40) in FIG. 8, referred to hereinbefore.

Then, the program proceeds to a step 65, wherein the error $\text{Eaf}_i$ is calculated using the equation (38) in FIG. 8, referred to hereinbefore, and then to a step 66, wherein a next value $\text{NEXTQ}_i$ [$=Q_i(n+1)$] of the square matrix calculated in the immediately preceding loop, stored in the RAM, is set to the current value $Q_i$ thereof.

Then, the program proceeds to a step 67, wherein the vector $KQ_i$ of the gain coefficient is calculated using the equation (41) in FIG. 8, referred to hereinbefore, and then to a step 68, wherein the regression coefficient vector $\theta\text{AFOFT\_LS}_i$ is calculated using the equation (36) in FIG. 8, referred to hereinbefore. Then, the program proceeds to a step 69, wherein the next value $\text{NEXTQ}_i$ [$=Q_i(n+1)$] of the square matrix is calculated using the equation (42) in FIG. 8, referred to hereinbefore.

On the other hand, when the answer to the question of the step 63 is negative (NO), i.e. at least one of the above five conditions (A) to (E) is not satisfied, the program proceeds to a step 70, wherein the preceding value $\text{PRV}\theta\text{AFOFT\_LS}_i$ of the regression coefficient vector set in the step 61 is set to the current value $\theta\text{AFOFT\_LS}_i$, followed by terminating the program. This causes the value calculated by the sequential least-squares method in the steps 64 to 69 in the current loop to be used as the immediately preceding value $\text{PRV}\theta\text{AFOFT\_LS}_i$ of the regression coefficient vector in the step 61 in the next loop.

Figure 14:
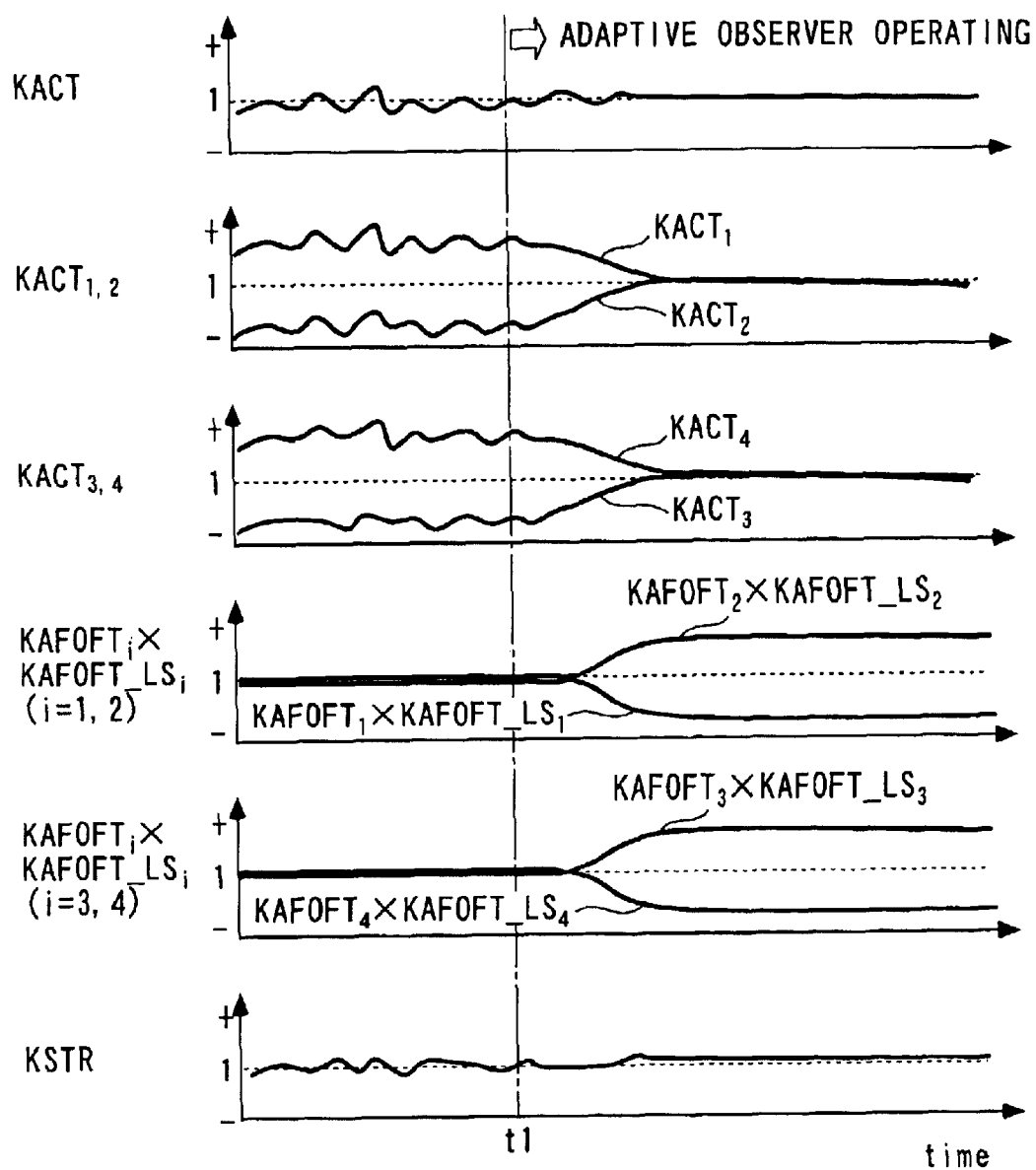
FIG. 14 is a timing chart showing an example of operations of the air-fuel ratio control executed by the air-fuel ratio control system.

Next, the operations of the air-fuel ratio control executed by the air-fuel ratio control system 1 will be described with reference to FIGS. 14 and 15. FIG. 14 shows an example of operations in the case where the air-fuel ratio control is carried out by the air-fuel ratio control system 1 according to the present embodiment, more specifically, the case where during the control provided by the STR 22 such that the detected air-fuel ratio KACT becomes equal to a value of 1 (equivalent ratio corresponding to the stoichiometric air-fuel ratio), the adaptive observer 23 in a stopped state is started, in other words, the adaptive observer 23 starts to calculate the variation correction coefficient KAFOFT and the learned value KAFOFT_LS thereof.

Figure 15:
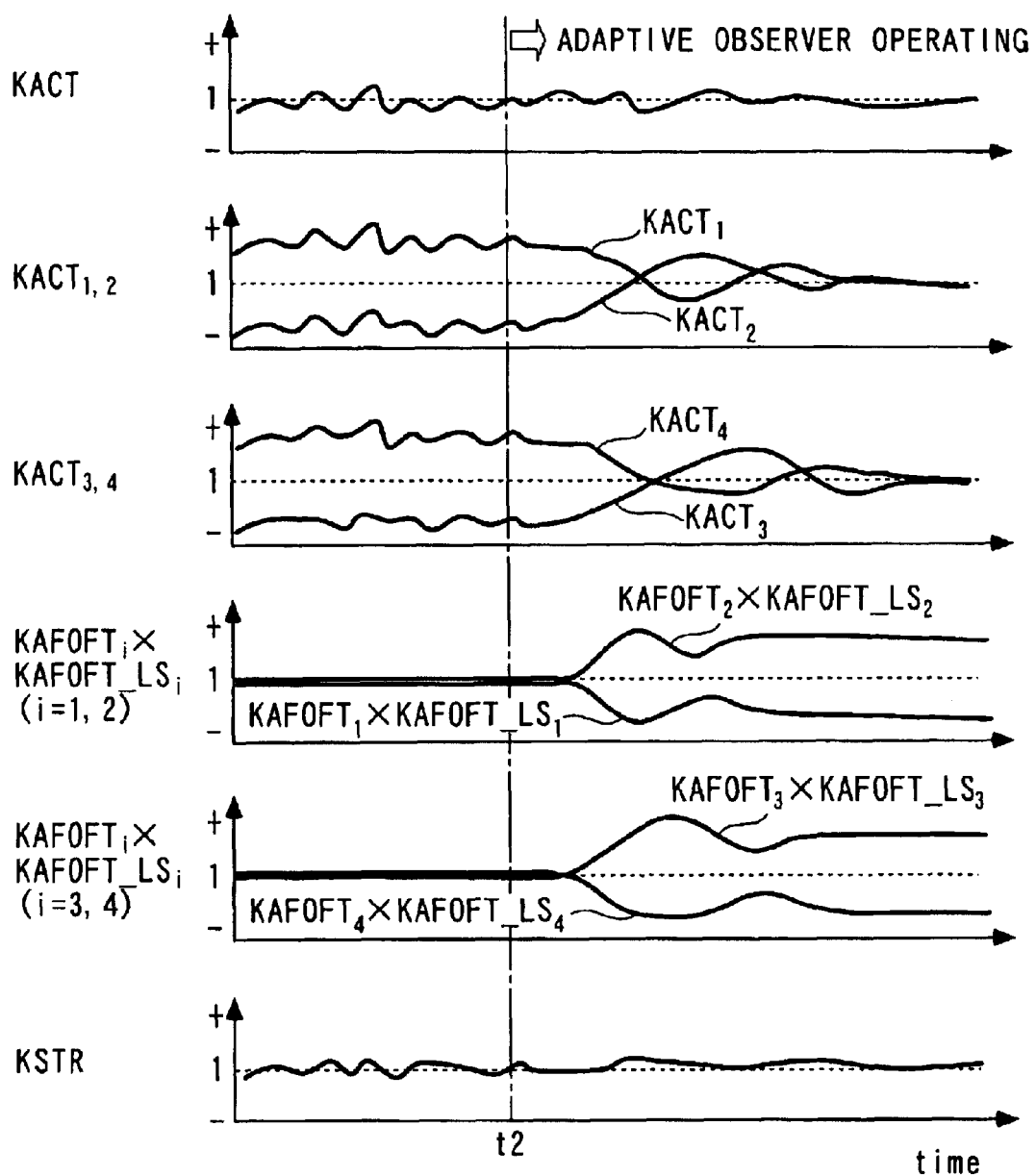
FIG. 15 is a timing chart showing a comparative example of operations of the air-fuel ratio control.

FIG. 15 shows, for comparison, a comparative example of operations of the air-fuel ratio control in which the learned value KAFOFT_LS is calculated by a conventional PID control algorithm (not shown) instead of the I-PD control algorithm expressed by the equations (32) and (33). In these two figures, the values $\text{KACT}_1$ to $\text{KACT}_4$ represent respective values of the air-fuel ratio (values in terms of the equivalent ratio) of exhaust gases which are emitted from the first to fourth cylinders #1 to #4 and not mixed yet. More specifically, they are calculated based on respective outputs from four measuring LAF sensors (not shown) which are additionally disposed in the exhaust manifold 7a at respective locations immediately downstream of the exhaust ports of the cylinders #1 to #4.

As shown in FIG. 14, in the example of operations of the air-fuel ratio control system according to the present embodiment, when the adaptive observer 23 is in stoppage, the values $\text{KACT}_1$ to $\text{KACT}_4$ indicative of the respective air-fuel ratio values of exhaust gases emitted from the cylinders are made unstable, and the detected air-fuel ratio KACT is affected thereby and also made somewhat unstable. However, when the adaptive observer 23 starts operation (time t1), with the lapse of some time, the values $\text{KACT}_1$ to $\text{KACT}_4$ all converge to a value of 1 (equivalent ratio corresponding to the stoichiometric air-fuel ratio) and accordingly, the detected air-fuel ratio KACT also converges to a value of 1. That is, it is understood that variation in air-fuel ratio between the cylinders is properly corrected. Further, it is understood that the product $\text{KAFOFT}_i \cdot \text{KAFOFT\_LS}_i$ (i=1 to 4) of the variation correction coefficient and the learned value thereof is also stable.

In contrast, in the comparative example shown in FIG. 15, even when some time has elapsed after the adaptive observer 23 starts operation (time t2), the values $\text{KACT}_1$ to $\text{KACT}_4$ do not smoothly converge to a value of 1, and accordingly, the detected air-fuel ratio KACT does not smoothly converge to a value of 1, either. In addition, it is understood that the product $\text{KAFOFT}_i \cdot \text{KAFOFT\_LS}_i$ (i=1 to 4) of the variation correction coefficient and the learned value thereof is not smoothly made stable, either. That is, it is understood that compared with the case of using the conventional PID control algorithm, the use of the I-PD control algorithm as in the present embodiment enables correction of variation in air-fuel ratio between the cylinders more promptly and more appropriately. The reason for this is that the learned value KAFOFT_LS can be more properly calculated by the I-PD control algorithm than by the PID control algorithm, without causing the overshooting behavior in converging the variation coefficient AFOFT to the moving average value AFOFTAVE.

As described above, according to the air-fuel ratio control system of the present embodiment, the STR 22 calculates the feedback correction coefficient KSTR such that the detected air-fuel ratio KACT converges to the target air-fuel ratio KCMD. Further, the adaptive observer 23 calculates the variation correction coefficient $\text{KAFOFT}_i$ and the learned value $\text{KAFOFT\_LS}_i$ thereof such that the variation coefficient $\text{AFOFT}_i$ indicative of variation in air-fuel ratio between the cylinders converges to the moving average value AFOFTAVE. Then, the basic fuel injection amount TIBS is corrected based on the calculated feedback correction coefficient KSTR, variation correction coefficient $\text{KAFOFT}_i$ and learned value $\text{KAFOFT\_LS}_i$ thereof, whereby the cylinder-by-cylinder final fuel injection amount $\text{TOUT}_i$ is calculated.

The adaptive observer 23 calculates the variation coefficient $\text{AFOFT}_i$ based on the model [equation (1)] having the input of the feedback correction coefficient KSTR and the output of the detected air-fuel ratio KACT, and the onboard identifier 22a identifies the model parameter vector $\theta_i$ of the model, which enables the variation coefficient $AFOFT_i$ to be calculated based on the model parameter vector $\theta_i$ identified in real time. This makes it possible, differently from the conventional system, even when the dynamic characteristics of the controlled object are changed due to changes in respective contributions of the cylinders to the detected air-fuel ratio KACT, which are caused by attachment of fuel in the cylinders, variation in the response of the LAF sensor 14, and aging of the LAF sensor 14, to calculate the cylinder-by-cylinder final fuel injection amount $TOUT_i$ such that variation in air-fuel ratio between the cylinders is corrected while causing changes in the dynamic characteristics of the controlled object to be reflected in the model. As a result, even in controlling the air-fuel ratio of the mixture supplied to the engine 3 having a complicated exhaust system layout, it is possible to realize a highly robust air-fuel ratio control, and thereby maintain an excellent emission reduction rate of the catalyst.

Further, the adaptive observer 23 calculates the variation correction coefficient $KAFOFT_i$ by the I-PD control algorithm, which makes it possible to calculate the variation correction coefficient $KAFOFT_i$ such that the variation coefficient $AFOFT_i(n)$ converges to the moving average value AFOFTAVE without an overshooting behavior. This makes it possible to correct variation in air-fuel ratio between the cylinders, while preventing the air-fuel ratio of a mixture supplied to each cylinder from exhibiting an oscillatory behavior. Further, since the variation correction coefficient $KAFOFT_i$ is calculated such that the variation coefficient $AFOFT_i$ converges to the moving average value AFOFTAVE, it is possible to correct variation in air-fuel ratio between the cylinders without interfering with the air-fuel ratio control by the STR 22.

Furthermore, the adaptive observer 23 calculates the learned value $KAFOFT\_LS_i$ of the variation correction coefficient $KAFOFT_i$ by the regression equation [equation (43)] using the exhaust gas volume ESV as an independent variable, and at the same time, the regression coefficient vector $\theta AFOFT\_LS_i(n)$ as a vector of the regression coefficient $AAFOFT\_LS_i(n)$ and the constant term $BAFOFT\_LS_i(n)$ is calculated by the sequential least-squared method. This makes it possible, even when the state of variation in air-fuel ratio between the cylinders is changed due to changes in the operating conditions of the engine 3, to calculate the cylinder-by-cylinder final fuel injection amount $TOUT_i$ as a value corrected in response to the changes in the operating conditions of the engine 3. Therefore, even when the engine 3 is in a transient operating condition, it is possible to control the air-fuel ratio while compensating for changes in the variation in air-fuel ratio between the cylinders.

Moreover, the adaptive observer 23 does not execute calculation of the regression coefficient vector $\theta AFOFT\_LS_i$ by the sequential least-squares method when at least one of the aforementioned five conditions (A) to (E) is not satisfied, and instead, a value thereof is used which was calculated using the variation correction coefficient KAFOFT obtained when the five conditions were satisfied on and before the immediately preceding occasion, i.e. when the engine 3 was in a stable operating condition. This makes it possible, even when the engine 3 is in an unstable operating condition, or in an extreme operating environment, to properly calculate the learned value $KAFOFT\_LS_i$ while avoiding influence of such a condition or an environment of the engine on the calculation, thereby properly correct the variation in air-fuel ratio between the cylinders. Thus, the emission reduction rate of the catalyst can be further improved.

On the other hand, in the STR 22, the STR controller 22b calculates one feedback correction coefficient KSTR, based on which the basic fuel injection amount TIBS to all the cylinders is corrected. This makes it possible to carry out the air-fuel ratio control such that the detected air-fuel ratio KACT converges to the target air-fuel ratio KCMD while avoiding interfering with the control provided for correction of variation in air-fuel ratio between the cylinders, thereby further improving the emission reduction rate of the catalyst.

Further, the onboard identifier 22a identifies the model parameter vector $\theta_i$ by the fixed gain method [equations (20) to (26)], which makes it possible to shorten the computing time, and reduce the size and cost of the ECU 2 including the CPU. Further, since the forgetting vector of is employed in the fixed gain method, it is possible to prevent the model parameter vector $\theta_i$ from drifting, and properly calculate the same, even when the engine 3 is in a steady operating condition, such as a cruising condition of the vehicle.

It should be noted that the regression equation used in the calculation of the cylinder-by-cylinder learned value $KAFOFT\_LS_i$ is not limited to the first-degree equation in the embodiment, but a n-th-degree equation (n is an integer equal to or larger than 2) may be used. In such a case as well, by calculating the regression coefficients and the constant terms of the n-th-degree equation by the sequential least-squares method, it is possible to obtain the same advantageous effects as provided by the present embodiment.

Further, although in the present embodiment, when the learned correction value $KOBSV\_LS_i$ is calculated based on the exhaust gas volume ESV by the regression equation, the regression coefficient $AAFOFT\_LS_i$ and the constant term $BAFOFT\_LS_i$ are calculated by the sequential least-squares method, this is not limitative, but the learned correction value $KOBSV\_LS_i$ can be calculated by another method. For example, there may be provided a table in which the relationship between the regression coefficient $AAFOFT\_LS_i$ and the constant term $BAFOFT\_LS_i$ of the regression equation and the exhaust gas volume ESV is defined in advance, and the two values of the regression coefficient $AAFOFT\_LS_i$ and the constant term $BAFOFT\_LS_i$ may be calculated by searching the table according to the exhaust gas volume ESV, and the learned correction value $KOBSV\_LS_i$ may be calculated based thereon. This can reduce the time for computing the learned correction value $KOBSV\_LS_i$, thereby reducing the computational load on the ECU 2.

Further, although in the present embodiment, the variation correction coefficient KAFOFTi is calculated by the I-PD control algorithm so as to cause the variation coefficient $AFOFT_i$ to converge to the moving average value AFOFTAVE thereof, this is not limitative, but the there may be employed another suitable control algorithm for calculating the variation correction coefficient $KAFOFT_i$ such that the variation coefficient $AFOFT_i$ converges to the moving average value AFOFTAVE thereof.

For example, instead of the I-PD control algorithm, an IP-D control algorithm (differential advanced PID control algorithm) expressed by equations (45) and (46) shown in FIG. 16 may be used to calculate the variation correction coefficient $KAFOFT_i$, or a response-specified control algorithm (sliding mode control algorithm, or back-stepping control algorithm) expressed by equations (47) to (49) in FIG. 16 may be employed to calculate the variation correction coefficient KAFOFT$_i$. Even when one of these control algorithms is employed, similarly to the case of using the I-PD control algorithm according to the present embodiment, it is possible to calculate the variation correction coefficient KAFOFT$_i$ such that the variation coefficient AFOFT$_i$ converges to the moving average value AFOFTAVE without exhibiting an overshooting behavior. As a result, it is possible to promptly and appropriately correct the variation in air-fuel ratio between the cylinders. Particularly, when the response-specified control algorithm is employed, it is possible to calculate the variation correction coefficient KAFOFT$_i$ such that the variation in air-fuel ratio between the cylinders is converged by a designated converging behavior.

Further, the average value of the variation coefficient as a target value to which the variation coefficient AFOFT$_i$ is to be converged is not limited to the moving average value AFOFTAVE in the present embodiment, but it may be a weighted average value.

Furthermore, the method of calculation of the basic fuel injection amount TIBS is not limited to that of searching the map according to the intake pipe absolute pressure PBA and the engine speed NE, described in the embodiment, but the basic fuel injection amount TIBS may be calculated by providing an air flow sensor 30 in the intake pipe 4 for detecting an intake air amount Gair, as illustrated by two-dot chain lines in FIG. 1, and searching a table according to the detected intake air amount Gair.

Further, although in the embodiment, the air-fuel ratio control system 1 according to the invention is applied to the four-cylinder engine 3, this is not limitative, but it goes without saying that the air-fuel ratio control system 1 may be applied to other multi-cylinder engines than the four-cylinder engine. Further, although in the embodiment, the STR 22 calculates the feedback correction coefficient KSTR based on the model parameter vector θ of the first cylinder #1, this is not limitative, but the feedback correction coefficient KSTR may be calculated based on the model parameter vector θ of one of the second to fourth cylinders #2 to #4.

It is further understood by those skilled in the art that the foregoing is a preferred embodiment of the present invention, and that various changes and modifications may be made without departing from the spirit and scope thereof.

What is claimed is:

1. An air-fuel ratio control system for an internal combustion engine including a plurality of cylinders and an exhaust passage through which exhaust gases from the cylinders flow, the air fuel ratio control system controlling an amount of fuel to be supplied to each of the cylinders, on a cylinder-by-cylinder basis, to thereby control an air fuel ratio of a mixture supplied to each cylinder, the air-fuel ratio control system comprising:

fuel amount-determining means for determining an amount of fuel to be supplied to each cylinder;

correction parameter-determining means for determining a correction parameter for correcting the amount of fuel to be supplied to each cylinder;

first fuel amount-correcting means for correcting the determined amount of fuel to be supplied to each cylinder, according to the determined correction parameter;

air-fuel ratio parameter-detecting means for detecting an air-fuel ratio parameter indicative of an air-fuel ratio of the exhaust gases flowing through the exhaust passage;

variation parameter-calculating means for calculating a variation parameter indicative of a variation in air-fuel ratio between the plurality of parameters, on a cylinder-by-cylinder basis, based on a model parameter of a model formed by modeling each cylinder and having an input of the correction parameter and an output of the air-fuel ratio parameter;

identification means for identifying the model parameter of the model based on the determined correction parameter and the detected air-fuel ratio parameter; and second fuel amount-correcting means for further correcting the amount of fuel to be supplied to the plurality of cylinders on a cylinder-by-cylinder basis such that the variation parameter calculated on a cylinder-by-cylinder basis converges to a predetermined target value.

2. An air-fuel ratio control system as claimed in claim 1, further comprising target value-setting means for setting an average value of the variation parameter to the predetermined target value.

3. An air-fuel ratio control system as claimed in claim 1, wherein said correction parameter-determining means determines the correction parameter such that the air-fuel ratio parameter is caused to converge to a predetermined target air-fuel ratio value.

4. An air-fuel ratio control system as claimed in claim 1, wherein the model parameter is of a model formed by modeling one of the plurality of cylinders, the correction parameter-determining means determining the correction parameter based on the model parameter, and wherein said first fuel amount-correcting means corrects the mount of fuel to be supplied to all of the plurality of cylinders according to the determined correction parameter.

5. An air-fuel ratio control system as claimed in claim 1, wherein said second fuel amount-correcting means executes correction of the amount of fuel, based on one of an I-PD control algorithm and an IP-D control algorithm.

6. An air-fuel ratio control system as claimed in claim 1, wherein said second fuel amount-correcting means executes correction of the amount of fuel, based on a response-specified control algorithm.

7. An air-fuel ratio control system for an internal combustion engine including a plurality of cylinders, the air fuel ratio control system controlling an amount of fuel to be supplied to each of the cylinders, on a cylinder-by-cylinder basis, to thereby control an air fuel ratio of a mixture supplied to each cylinder, the air-fuel ratio control system comprising:

first operating condition parameter-detecting means for detecting a first operating condition parameter indicative of an operating condition of the engine:

fuel amount-determining means for determining an amount of fuel to be supplied to each cylinder;

variation correction coefficient-calculating means for calculating a variation correction coefficient for correcting variation in air-fuel ratio between the plurality of cylinders, on a cylinder-by-cylinder basis;

learned value-calculating means for calculating a learned value of the variation correction coefficient according to the calculated variation correction coefficient and the detected first operating condition parameter; and fuel amount-correcting means for correcting the determined amount of fuel to be supplied to each cylinder, according to the calculated learned value of the variation correction coefficient and the calculated variation correction coefficient.

8. An air-fuel ratio control system as claimed in claim 7, wherein said learned value-calculating means calculates the learned value of the variation correction coefficient, by a regression equation using the leaned value as a dependent variable and at the same time using the first operating condition parameter as an independent variable, and calculates a regression coefficient and a constant term of the regression equation by a sequential least-squares method.

9. An air-fuel ratio control system as claimed in claim 7, further comprising second operating condition parameter-detecting means for detecting a second operating condition parameter indicative of an operating condition of the engine, and wherein when the detected second operating condition parameter is not within a predetermined range, said learned value-calculating means calculates the learned value of the variation correction coefficient, on a cylinder-by-cylinder basis, according to a value of the variation correction coefficient calculated when the detected second operating condition parameter was within the predetermined range.

10. An air-fuel ratio control system as claimed in claim 7, further comprising operating environment parameter-detecting means for detecting an operating environment parameter indicative of an operating environment of the engine, and wherein when the detected operating environment parameter is not within a predetermined range, said learned value-calculating means calculates the learned value of the variation correction coefficient, on a cylinder-by-cylinder basis, according to a value of the variation correction coefficient calculated when the detected operating environment parameter was within the predetermined range.

11. An air-fuel ratio control method for an internal combustion engine including a plurality of cylinders and an exhaust passage through which exhaust gases from the cylinders flow, the air fuel ratio control method including controlling an amount of fuel to be supplied to each of the cylinders, on a cylinder-by-cylinder basis, to thereby control an air fuel ratio of a mixture supplied to each cylinder, the air-fuel ratio control method comprising:

a fuel amount-determining step of determining an amount of fuel to be supplied to each cylinder;

a correction parameter-determining step of determining a correction parameter for correcting the amount of fuel to be supplied to each cylinder;

a first fuel amount-correcting step of correcting the determined amount of fuel to be supplied to each cylinder, according to the determined correction parameter;

an air-fuel ratio parameter-detecting step of detecting an air-fuel ratio parameter indicative of an air-fuel ratio of the exhaust gases flowing through the exhaust passage;

a variation parameter-calculating step of calculating a variation parameter indicative of a variation in air-fuel ratio between the plurality of parameters, on a cylinder-by-cylinder basis, based on a model parameter of a model formed by modeling each cylinder and having an input of the correction parameter and an output of the air-fuel ratio parameter;

an identification step of identifying the model parameter of the model based on the determined correction parameter and the detected air-fuel ratio parameter; and a second fuel amount-correcting step of further correcting the amount of fuel to be supplied to the plurality of cylinders on a cylinder-by-cylinder basis such that the variation parameter calculated on a cylinder-by-cylinder basis converges to a predetermined target value.

12. An air-fuel ratio control method as claimed in claim 11, further comprising a target value-setting step of setting an average value of the variation parameter to the predetermined target value.

13. An air-fuel ratio control method as claimed in claim 11, wherein said correction parameter-determining step includes determining the correction parameter such that the air-fuel ratio parameter is caused to converge to a predetermined target air-fuel ratio value.

14. An air-fuel ratio control method as claimed in claim 11, wherein the model parameter is of a model formed by modeling one of the plurality of cylinders, wherein said correction parameter-determining step includes determining the correction parameter based on the model parameter and wherein said first fuel amount-correcting step includes correcting the mount of fuel to be supplied to all of the plurality of cylinders according to the determined correction parameter.

15. An air-fuel ratio control method as claimed in claim 11, wherein said second fuel amount-correcting step includes executing correction of the amount of fuel, based on one of an I-PD control algorithm and an IP-D control algorithm.

16. An air-fuel ratio control method as claimed in claim 11, wherein said second fuel amount-correcting step executes correction of the amount of fuel, based on a response-specified control algorithm.

17. An air-fuel ratio control method for an internal combustion engine including a plurality of cylinders, the air fuel ratio control method including controlling an amount of fuel to be supplied to each of the cylinders, on a cylinder-by-cylinder basis, to thereby control an air fuel ratio of a mixture supplied to each cylinder, the air-fuel ratio control method comprising:

a first operating condition parameter-detecting step of detecting a first operating condition parameter indicative of an operating condition of the engine;

a fuel amount-determining step of determining an amount of fuel to be supplied to each cylinder;

a variation correction coefficient-calculating step of calculating a variation correction coefficient for correcting variation in air-fuel ratio between the plurality of cylinders, on a cylinder-by-cylinder basis;

a learned value-calculating step of calculating a learned value of the variation correction coefficient, on a cylinder-by-cylinder basis, according to the calculated variation correction coefficient and the detected first operating condition parameter; and a fuel amount-correcting step of correcting the determined amount of fuel to be supplied to each cylinder, according to the calculated learned value of the variation correction coefficient and the calculated variation correction coefficient.

18. An air-fuel ratio control method as claimed in claim 17, wherein said learned value-calculating step includes calculating the learned value of the variation correction coefficient, by a regression equation using the leaned value as a dependent variable and at the same time using the first operating condition parameter as an independent variable, and calculating a regression coefficient and a constant term of the regression equation by a sequential least-squares method.

19. An air-fuel ratio control method as claimed in claim 17, further comprising a second operating condition parameter-detecting step of detecting a second operating condition parameter indicative of an operating condition of the engine, and wherein said learned value-calculating step includes calculating, when the detected second operating condition parameter is not within a predetermined range, the learned value of the variation correction coefficient on a cylinder-by-cylinder basis according to a value of the variation correction coefficient calculated when the detected second operating condition parameter was within the predetermined range.

20. An air-fuel ratio control method as claimed in claim 17, further comprising an operating environment parameter-detecting step of detecting an operating environment parameter indicative of an operating environment of the engine, and wherein said learned value-calculating step includes calculating, when the detected operating environment parameter is not within a predetermined range, the learned value of the variation correction coefficient on a cylinder-by-cylinder basis according to a value of the variation correction coefficient calculated when the detected operating environment parameter was within the predetermined range.

21. An engine control unit including a control program for causing a computer to perform an air-fuel ratio control process for an internal combustion engine including a plurality of cylinders and an exhaust passage through which exhaust gases from the cylinders flow, the air fuel ratio control process including controlling an amount of fuel to be supplied to each of the cylinders, on a cylinder-by-cylinder basis, to thereby control an air fuel ratio of a mixture supplied to each cylinder, wherein the program causes the computer to determine an amount of fuel to be supplied to each cylinder, determine a correction parameter for correcting the amount of fuel to be supplied to each cylinder, correct the determined amount of fuel to be supplied to each cylinder, according to the determined correction parameter, detect an air-fuel ratio parameter indicative of an air-fuel ratio of the exhaust gases flowing through the exhaust passage, calculate a variation parameter indicative of a variation in air-fuel ratio between the plurality of parameters, on a cylinder-by-cylinder basis, based on a model parameter of a model formed by modeling each cylinder and having an input of the correction parameter and an output of the air-fuel ratio parameter, identify the model parameter of the model according to the determined correction parameter and the detected air-fuel ratio parameter, and further correct the amount of fuel to be supplied to the plurality of cylinders on a cylinder-by-cylinder basis such that the variation parameter calculated on a cylinder-by-cylinder basis converges to a predetermined target value.

22. An engine control unit as claimed in claim 21, wherein the program causes the computer to set an average value of the variation parameter to the predetermined target value.

23. An engine control unit as claimed in claim 21, wherein the program causes the computer to determine the correction parameter such that the air-fuel ratio parameter is caused to converge to a predetermined target air-fuel ratio value.

24. An engine control unit as claimed in claim 21, wherein the model parameter is of a model formed by modeling one of the plurality of cylinders, and wherein the program causing the computer to determine the correction parameter based on the model parameter, and wherein when the program causes the computer to correct the amount of fuel to be supplied to each cylinder, the program causes the computer to correct the mount of fuel to be supplied to all of the plurality of cylinders according to the determined correction parameter.

25. An engine control unit as claimed in claim 21, wherein when the program causes the computer to further correct the amount of fuel to be supplied to the plurality of cylinders, on a cylinder-by-cylinder basis, the program causes the computer to correct the amount of fuel, based on one of an I-PD control algorithm and an IP-D control algorithm.

26. An engine control unit as claimed in claim 21, wherein when the program causes the computer to further correct the amount of fuel to be supplied to the plurality of cylinders, on a cylinder-by-cylinder basis, the program causes the computer to correct the amount of fuel, based on a response-specified control algorithm.

27. An engine control unit including a control program for causing a computer to perform an air-fuel ratio control process for an internal combustion engine including a plurality of cylinders, the air fuel ratio control process including controlling an amount of fuel to be supplied to each of the cylinders, on a cylinder-by-cylinder basis, to thereby control an air fuel ratio of a mixture supplied to each cylinder, wherein the program causes the computer to detect a first operating condition parameter indicative of an operating condition of the engine, determine an amount of fuel to be supplied to each cylinder, calculate a variation correction coefficient for correcting variation in air-fuel ratio between the plurality of cylinders, on a cylinder-by-cylinder basis, calculate a learned value of the variation correction coefficient, on a cylinder-by-cylinder basis, according to the calculated variation correction coefficient and the detected first operating condition parameter, and correct the determined amount of fuel to be supplied to each cylinder, according to the calculated learned value of the variation correction coefficient and the calculated variation correction coefficient.

28. An engine control unit as claimed in claim 27, wherein the program causes the computer to calculate the learned value of the variation correction coefficient, by a regression equation using the leaned value as a dependent variable and at the same time using the first operating condition parameter as an independent variable, and calculate a regression coefficient and a constant term of the regression equation by a sequential least-squares method.

29. An engine control unit as claimed in claim 27, wherein the program causes the computer to detect a second operating condition parameter indicative of an operating condition of the engine, and when the detected second operating condition parameter is not within a predetermined range, the program causes the computer to calculate the learned value of the variation correction coefficient on a cylinder-by-cylinder basis according to a value of the variation correction coefficient calculated when the detected second operating condition parameter was within the predetermined range.

30. An engine control unit as claimed in claim 27, wherein the program causes the computer to detect an operating environment parameter indicative of an operating environment of the engine, and when the detected operating environment parameter is not within a predetermined range, the program causes the computer to calculate the learned value of the variation correction coefficient on a cylinder-by-cylinder basis according to a value of the variation correction coefficient calculated when the detected operating environment parameter was within the predetermined range.

* * * * *